United States Patent
Jin et al.

(10) Patent No.: US 12,543,087 B2
(45) Date of Patent: Feb. 3, 2026

(54) COMMUNICATION METHOD AND APPARATUS

(71) Applicant: Huawei Technologies Co., Ltd., Shenzhen (CN)

(72) Inventors: Hui Jin, Shenzhen (CN); Xiaobo Wu, Shenzhen (CN); Yang Xin, Shanghai (CN); Fenghui Dou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 18/151,226

(22) Filed: Jan. 6, 2023

(65) Prior Publication Data

US 2023/0142002 A1 May 11, 2023

Related U.S. Application Data

(63) Continuation of application No. PCT/CN2021/105005, filed on Jul. 7, 2021.

(30) Foreign Application Priority Data

| Jul. 8, 2020 | (CN) | .......................... 202010650556.0 |
| Oct. 21, 2020 | (CN) | .......................... 202011133659.6 |

(51) Int. Cl.
*H04W 36/16* (2009.01)
*H04W 24/08* (2009.01)
*H04W 76/19* (2018.01)

(52) U.S. Cl.
CPC ......... *H04W 36/165* (2013.01); *H04W 24/08* (2013.01); *H04W 76/19* (2018.02)

(58) Field of Classification Search
None
See application file for complete search history.

(56) References Cited

U.S. PATENT DOCUMENTS 11,051,192 B2 * 6/2021 Li .......................... H04W 24/08
12,143,852 B2 * 11/2024 Di Girolamo .......... H04L 43/14
(Continued)

FOREIGN PATENT DOCUMENTS

| CN | 105282199 A | 1/2016 |
| CN | 110300006 A | 10/2019 |

(Continued)

OTHER PUBLICATIONS

3GPP TS 23.288 V16.3.0 (Mar. 2020);3rd Generation Partnership Project; Technical Specification Group Services and System Aspects;Architecture enhancements for 5G System (5GS) to support;network data analytics services (Release 16), total 61 pages.

(Continued)

*Primary Examiner* — Yaotang Wang
(74) *Attorney, Agent, or Firm* — Slater Matsil, LLP

(57) ABSTRACT

This application discloses a communication method. When determining that a network used to provide a service does not meet a transmission requirement of service data, a terminal device requests, from a PCF, an SMF, or an NWADF, to analyze a reason why the network does not meet the transmission requirement of the service data. The PCF, the SMF, or the NWADF obtains information used to recover a service, and sends the information to a device that performs a service recovery operation, for example, the terminal device or an access network device. The information used to recover the service is used to enable the network to meet the transmission requirement of the service data.

20 Claims, 16 Drawing Sheets

(56) References Cited

U.S. PATENT DOCUMENTS

| | | | |
|---|---|---|---|
| 12,207,218 B2* | 1/2025 | Li | H04W 60/00 |
| 2020/0112907 A1 | 4/2020 | Dao et al. | |
| 2021/0014141 A1* | 1/2021 | Patil | H04W 76/25 |
| 2021/0314906 A1* | 10/2021 | Matolia | H04W 24/10 |
| 2023/0140532 A1* | 5/2023 | Estevez | H04W 4/60 |
| | | | 370/235 |
| 2023/0147409 A1* | 5/2023 | Park | H04L 12/56 |
| | | | 370/329 |
| 2023/0269141 A1* | 8/2023 | Han | H04W 88/18 |

FOREIGN PATENT DOCUMENTS

| | | |
|---|---|---|
| CN | 106416349 B | 1/2020 |
| EP | 3829216 A1 | 6/2021 |
| WO | 2018032517 A1 | 2/2018 |
| WO | 2020034844 A1 | 2/2020 |

OTHER PUBLICATIONS

3GPP TS 23.501 V16.4.0 (Mar. 2020);3rd Generation Partnership Project;Technical Specification Group Services and System Aspects-;System architecture for the 5G System (5GS);Stage 2 (Release 16), total 421 pages.

3GPP TS 23.502 V16.4.0 (Mar. 2020);3rd Generation Partnership Project;Technical Specification Group Services and System Aspects;Procedures for the 5G System (5GS);Stage 2 (Release 16), total 576 pages.

3GPP TS 23.503 V16.4.1 (Mar. 2020);3rd Generation Partnership Project;Technical Specification Group Services and System Aspects; Policy and charging control framework for the 5G System (5GS); Stage 2 (Release 16), total 110 pages.

* cited by examiner

COMMUNICATION METHOD AND APPARATUS

CROSS-REFERENCE TO RELATED APPLICATIONS

This application is a continuation of International Application No. PCT/CN2021/105005, filed on Jul. 7, 2021, which claims priority to Chinese Patent Application No. 202010650556.0, filed on Jul. 8, 2020 and Chinese Patent Application No. 202011133659.6, filed on Oct. 21, 2020. All of the aforementioned patent applications are hereby incorporated by reference in their entireties.

TECHNICAL FIELD

Embodiments of this application relate to the field of communication technologies, and in particular, to a communication method and apparatus.

BACKGROUND

On a live network, a terminal often encounters a case in which a data channel cannot meet a service requirement, for example, a transmission delay or transmission bandwidth does not meet a service transmission requirement. For example, a delay of a game is required to be less than 460 ms, and when the delay is greater than 460 ms, an effective operation cannot be performed on a game character. Generally, when this case occurs, the terminal autonomously makes an attempt, for example, attempts to reconnect to the network, or attempts to restart a modem. However, an autonomous attempt solution causes a relatively long delay, and brings poor experience to a user.

SUMMARY

Embodiments of this application provide a communication method and apparatus, to resolve a long delay problem.

According to a first aspect, an embodiment of this application provides a communication method, including: A terminal device sends a first request to a first core network element when determining that a network does not meet a transmission requirement of service data. The first request includes one or more of an application identifier, service status information, or a service indicator. The application identifier is used to identify an application to which the service data belongs, the service status information is used to represent a transmission status of the service data, and the service indicator is used to represent the transmission requirement of the service data. The terminal device receives a recovery policy from the first core network element. The recovery policy is used to enable the network to meet the transmission requirement of the service data. The terminal device executes the recovery policy.

In the foregoing solution, when determining that the transmission requirement of the service data is not met, the terminal device requests, from a network side, to analyze a reason why the network meets the transmission requirement of the service data, so that the network side determines the recovery policy for the terminal device and sends the recovery policy to the terminal device. Therefore, the terminal device no longer makes a blind attempt, and can make an adjustment in time, so that a service can be quickly recovered for a user, a delay is reduced, and user experience is improved.

In a possible design, the terminal device may execute the recovery policy in any one of the following manners:

When the recovery policy includes protocol data unit (PDU) session re-establishment, the terminal device triggers a PDU session re-establishment procedure.

Alternatively, when the recovery policy includes cell handover, the terminal device selects a first cell from neighboring cells of a serving cell of the terminal device, and triggers a procedure of handover from the serving cell to the first cell.

Alternatively, when the recovery policy includes access network device handover, the terminal device selects a first cell from neighboring cells of a serving cell of the terminal device, where the first cell and the serving cell belong to different access network devices; and triggers a procedure of handover from the serving cell to the first cell.

Alternatively, when the recovery policy includes communication network handover, the terminal device triggers a procedure of handover from a currently accessed first communication network to a second communication network. Radio access technologies RATs used by the first communication network and the second communication network are different.

Alternatively, when the recovery policy includes application layer processing, the terminal device performs the application layer processing based on a type of the service data.

In the foregoing design, the terminal device executes the recovery policy indicated by the network side, to avoid a relatively large delay caused by blind attempts.

In a possible design, the first core network element is a network data analytics function (NWDAF) network element, a policy control function (PCF) network element, or a session management network element.

In a possible design, the first core network element is the PCF network element, and the terminal device may send the first request to the first core network element in any one of the following manners:

The terminal device sends the first request to the PCF network element by using the session management network element. The first request is a PDU session modify request.

Alternatively, the terminal device sends the first request to the PCF network element by using a mobility management network element. The first request is a registration request.

In a possible design, the first core network element is the NWDAF network element, and the terminal device sends the first request to the first core network element includes:

The terminal device sends the first request to the NWDAF network element by using the session management network element. The first request is a PDU session modify request.

Alternatively, the terminal device sends the first request to the NWDAF network element by using a mobility management network element. The first request is a registration request.

Alternatively, the terminal device sends the first request to the NWDAF network element by using an application function AF network element. The first request is a network status request.

According to a second aspect, an embodiment of this application provides another communication method, including: A first core network element receives a first request from a terminal device. The first request includes one or more of an application identifier or service status information. The application identifier is used to identify an application to which service data belongs, and the service status information is used to represent a transmission status of the service data. The first core network element sends a second request to an NWDAF network element. The second request includes one or more of the application identifier or the service status information. The first core network element receives network transmission information from the NWDAF network element. The network transmission information is used to represent a transmission status of a network that provides a service for the terminal device. The first core network element generates a recovery policy based on the network transmission information. The recovery policy is used to enable the network that provides a service for the terminal device to meet a transmission requirement of the service data. The first core network element sends the recovery policy to a device for executing the recovery policy. The device for executing the recovery policy is the terminal device or a first access network device accessed by the terminal device. In the foregoing solution, the terminal device sends the first request when the transmission status of the service data indicates that the network does not meet the transmission requirement of the service data. The first core network element formulates the recovery policy for the terminal device based on the network transmission information sent by the NWDAF, and sends the recovery policy to the terminal device. Therefore, the terminal device no longer makes a blind attempt, and can make an adjustment in time, so that a service can be quickly recovered for a user, a delay is reduced, and user experience is improved.

In a possible design, the first core network element may be a policy control function PCF network element or a session management network element.

In a possible design, the network transmission information includes network status information and/or network capability information. The network status information is used to represent a transmission status of a network element in the network that provides a service for the terminal device, and the network capability information is used to represent a service processing capability of the network element in the network that provides a service for the terminal device.

In a possible design, the network element in the network that provides a service for the terminal device includes one or more of the following: the first access network device that provides an access service for the terminal device, a first user plane network element that provides a user plane service for the terminal device, a cell accessed by the terminal device, or an application server that provides a service for the terminal device.

In a possible design, the first request and the second request further carry a service indicator, and the service indicator is used to represent the transmission requirement of the service data.

In a possible design, the network capability information includes one or more of the following: first capability information, where the first capability information is used to indicate whether a service processing capability of the first access network device meets the service indicator; second capability information, where the second capability information is used to indicate whether a service processing capability of a first cell accessed by the terminal device meets the service indicator; third capability information, where the third capability information is used to indicate whether a service processing capability of the first user plane network element that provides a user plane service for the terminal device meets the service indicator; fourth capability information, where the fourth capability information is used to indicate whether a service processing capability of the application server that provides a service for the terminal device meets the service indicator; fifth capability information, where the fifth capability information is used to indicate whether a data network with which the terminal device registers includes a second user plane network element whose service processing capability meets the service indicator; or sixth capability information, where the sixth capability information is used to indicate whether a data network with which the terminal device registers includes a second cell whose service processing capability meets the service indicator.

In a possible design, the device for executing the recovery policy is the terminal device, and generating the recovery policy based on the network transmission information may be implemented in one or more of the following manners: if the first capability information indicates that the first access network device does not meet the service indicator, and the third capability information indicates that the first user plane network element meets the service indicator, generating a recovery policy including access network device handover; if the second capability information indicates that the first cell does not meet the service indicator, and the third capability information indicates that the first user plane network element meets the service indicator, generating a recovery policy including cell handover; if the third capability information indicates that the first user plane network element does not meet the service indicator, and the fifth capability information indicates that the data network with which the terminal device registers includes the second user plane network element, generating a recovery policy including protocol data unit PDU session re-establishment; if the second capability information indicates that the first cell does not meet the service indicator, and the sixth capability information indicates that the data network with which the terminal device registers does not include the second cell, generating a recovery policy including communication network handover, where a communication network before handover and a communication network after handover use different radio access technologies RATs; or if the fourth capability information indicates that the application server that provides a service for the terminal device does not meet the service indicator, generating a recovery policy including application layer processing. In the foregoing design, the terminal device executes the recovery policy indicated by the network side, to avoid a relatively large delay caused by blind attempts.

In a possible design, the device for executing the recovery policy is the first access network device, and generating the recovery policy based on the network transmission information may be implemented in one or more of the following manners: if the first capability information indicates that the first access network device does not meet the service indicator, and the third capability information indicates that the first user plane network element meets the service indicator, generating a recovery policy including access network device handover; if the second capability information indicates that the first cell does not meet the service indicator, and the third capability information indicates that the first user plane network element meets the service indicator, generating a recovery policy including cell handover; or if the second capability information indicates that the first cell does not meet the service indicator, and the sixth capability information indicates that the data network with which the terminal device registers does not include the second cell, generating a recovery policy including communication network handover, where a communication network before handover and a communication network after handover use different radio access technologies RATs. In the foregoing design, the NWDAF analyzes whether each device that provides a service for the terminal device meets a service requirement, and determines whether there is a device that meets the service requirement. In other words, the NWDAF can generate a recovery policy for the terminal device in a targeted manner, to avoid a relatively large delay caused by blind attempts of the terminal device.

In a possible design, the first request carries a service indicator, and the service indicator is used to represent the transmission requirement of the service data.

In a possible design, that the first core network element generates a recovery policy based on the network transmission information includes: determining, based on the network capability information, whether the service processing capability of the network element in the network that provides a service for the terminal device meets the service indicator, and generating the recovery policy. In the foregoing design, when the first request carries the service indicator, when determining that a device currently providing a service for the terminal device does not meet the service requirement, a first core network device determines whether there is a device that meets the service requirement and that can provide a service for the terminal device, to improve accuracy of a specified recovery policy and further reduce a delay.

In a possible design, the network capability information includes one or more of the following: first capability information, where the first capability information is used to indicate a service processing capability of the first access network device accessed by the terminal device; second capability information, where the second capability information is used to represent a service processing capability of a first cell accessed by the terminal device; third capability information, where the third capability information is used to represent a service processing capability of the first user plane network element that provides a user plane service for the terminal device; fourth capability information, where the fourth capability information is used to represent a service processing capability of the application server that provides a service for the terminal device; fifth capability information, where the fifth capability information is used to indicate a service processing capability of a user plane network element included in a data network with which the terminal device registers; or sixth capability information, where the sixth capability information is used to indicate a service processing capability of a cell included in a data network with which the terminal device registers.

In a possible design, the device for executing the recovery policy is the terminal device, and generating the recovery policy based on the network transmission information includes: if the first capability information indicates that the first access network device does not meet the service indicator, and the third capability information indicates that the first user plane network element meets the service indicator, generating a recovery policy including access network device handover; if the second capability information indicates that the first cell does not meet the service indicator, and the third capability information indicates that the first user plane network element meets the service indicator, generating a recovery policy including cell handover; if the third capability information indicates that the first user plane network element does not meet the service indicator, and the fifth capability information indicates that the data network with which the terminal device registers includes the second user plane network element, generating a recovery policy including protocol data unit PDU session re-establishment; if the second capability information indicates that the first cell does not meet the service indicator, and the sixth capability information indicates that the data network with which the terminal device registers does not include the second cell, generating a recovery policy including communication network handover, where a communication network before handover and a communication network after handover use different radio access technologies RATs; or if the fourth capability information indicates that the application server that provides a service for the terminal device does not meet the service indicator, generating a recovery policy including application layer processing. The foregoing design provides several effective and simple manners of determining a recovery policy.

In a possible design, the device for executing the recovery policy is the first access network device, and generating the recovery policy based on the network transmission information includes: if the first capability information indicates that the first access network device does not meet the service indicator, and the third capability information indicates that the first user plane network element meets the service indicator, generating a recovery policy including access network device handover; if the second capability information indicates that the first cell does not meet the service indicator, and the third capability information indicates that the first user plane network element meets the service indicator, generating a recovery policy including cell handover; or if the second capability information indicates that the first cell does not meet the service indicator, and the sixth capability information indicates that the data network with which the terminal device registers does not include the second cell, generating a recovery policy including communication network handover, where a communication network before handover and a communication network after handover use different radio access technologies RATs. The foregoing design provides several effective and simple manners of determining a recovery policy.

In a possible design, the network status information includes one or more of the following: first load status information, where the first load status information is used to represent a load status of the first access network device; second load status information, where the second load status information is used to represent a load status of a first cell; third load status information, where the third load status information is used to represent a load status of the first user plane network element; fourth load status information, where the fourth load status information is used to represent a load status of the application server; fifth load status information, where the fifth load status information is used to indicate whether a data network with which the terminal device registers includes a second user plane network element that is not congested; or sixth load status information, where the sixth load status information is used to indicate whether a data network with which the terminal device registers includes a second cell that is not congested.

In a possible design, the device for executing the recovery policy is the terminal device, and generating the recovery policy based on the network transmission information includes: if the first load status information indicates that the first access network device is congested and the third load status information indicates that the first user plane network element is not congested, generating a recovery policy including access network device handover; if the second load status information indicates that the first cell is congested and the third load status information indicates that the first user plane network element is not congested, generating a recovery policy including cell handover; if the third load status information indicates that the first user plane network element is congested and the fifth load status information indicates that the data network with which the terminal device registers does not include the second user plane network element, generating a recovery policy including protocol data unit PDU session re-establishment; if the second load status information indicates that the first cell is congested and the sixth load status information indicates that the data network with which the terminal device registers does not include the second cell, generating a recovery policy including communication network handover, where a communication network before handover and a communication network after handover use different radio access technologies RATs; or if the fourth load status information indicates that the application server that provides a service for the terminal device is congested, generating a recovery policy including application layer processing. The foregoing design provides several effective and simple manners of determining a recovery policy.

In a possible design, the device for executing the recovery policy is the first access network device, and generating the recovery policy based on the network transmission information includes: if the first load status information indicates that the first access network device is congested and the third load status information indicates that the first user plane network element is not congested, generating a recovery policy including access network device handover; if the second load status information indicates that the first cell is congested and the third load status information indicates that the first user plane network element is not congested, generating a recovery policy including cell handover; or if the second load status information indicates that the first cell is congested and the sixth load status information indicates that the data network with which the terminal device registers does not include the second cell, generating a recovery policy including communication network handover, where a communication network before handover and a communication network after handover use different radio access technologies RATs. The foregoing design provides several effective and simple manners of determining a recovery policy.

According to a third aspect, an embodiment of this application provides a communication method, including: An NWDAF network element receives a first request. The first request includes one or more of an application identifier, service status information, or a service indicator. The application identifier is used to identify an application to which service data belongs, the service status information is used to represent a transmission status of the service data, and the service indicator is used to represent a transmission requirement of the service data. The NWDAF network element obtains network transmission information based on the first request. The network transmission information is used to represent a transmission status of a network that provides a service for a terminal device. The NWDAF network element generates a recovery policy based on the network transmission information. The recovery policy is used to enable the network that provides a service for the terminal device to meet the transmission requirement of the service data. The NWDAF network element sends the recovery policy to a device for executing the recovery policy. The device for executing the recovery policy is the terminal device or an access network device accessed by the terminal device. In the foregoing solution, the terminal device sends the first request when the transmission status of the service data indicates that the network does not meet the transmission requirement of the service data. The NWDAF formulates the recovery policy for the terminal device, and sends the recovery policy to the terminal device. Therefore, the terminal device no longer makes a blind attempt, and can make an adjustment in time, so that a service can be quickly recovered for a user, a delay is reduced, and user experience is improved.

In a possible design, the network transmission information includes network status information and/or network capability information. The network status information is used to represent a transmission status of a network element in the network that provides a service for the terminal device, and the network capability information is used to represent a service processing capability of the network element in the network that provides a service for the terminal device.

In a possible design, the network element in the network that provides a service for the terminal device includes one or more of the following: The first access network device that provides an access service for the terminal device, a first user plane network element that provides a user plane service for the terminal device, a cell accessed by the terminal device, or an application server that provides a service for the terminal device.

In a possible design, that the NWDAF generates a recovery policy based on the network transmission information includes: determining, based on the network capability information, whether the service processing capability of the network element in the network that provides a service for the terminal device meets the service indicator, and generating the recovery policy.

In a possible design, the first request carries the service indicator, and the network capability information includes one or more of the following: first capability information, where the first capability information is used to indicate a service processing capability of the first access network device accessed by the terminal device; second capability information, where the second capability information is used to represent a service processing capability of a first cell accessed by the terminal device; third capability information, where the third capability information is used to represent a service processing capability of the first user plane network element that provides a user plane service for the terminal device; fourth capability information, where the fourth capability information is used to represent a service processing capability of the application server that provides a service for the terminal device; fifth capability information, where the fifth capability information is used to indicate a service processing capability of a user plane network element included in a data network with which the terminal device registers; or sixth capability information, where the sixth capability information is used to indicate a service processing capability of a cell included in a data network with which the terminal device registers.

In a possible design, the device for executing the recovery policy is the terminal device, and the determining, based on the network capability information, whether the service processing capability of the network element in the network that provides a service for the terminal device meets the service indicator, and generating the recovery policy includes: if the first capability information indicates that the first access network device does not meet the service indicator, and the third capability information indicates that the first user plane network element meets the service indicator, generating a recovery policy including access network device handover; if the second capability information indicates that the first cell does not meet the service indicator, and the third capability information indicates that the first user plane network element meets the service indicator, generating a recovery policy including cell handover; if the third capability information indicates that the first user plane network element does not meet the service indicator, and the fifth capability information indicates that the data network with which the terminal device registers includes the second user plane network element, generating a recovery policy including protocol data unit PDU session re-establishment; if the second capability information indicates that the first cell does not meet the service indicator, and the sixth capability information indicates that the data network with which the terminal device registers does not include the second cell, generating a recovery policy including communication network handover, where a communication network before handover and a communication network after handover use different radio access technologies RATs; or if the fourth capability information indicates that the application server that provides a service for the terminal device does not meet the service indicator, generating a recovery policy including application layer processing.

In a possible design, the device for executing the recovery policy is the first access network device, and generating the recovery policy based on the network transmission information includes: if the first capability information indicates that the first access network device does not meet the service indicator, and the third capability information indicates that the first user plane network element meets the service indicator, generating a recovery policy including access network device handover; if the second capability information indicates that the first cell does not meet the service indicator, and the third capability information indicates that the first user plane network element meets the service indicator, generating a recovery policy including cell handover; or if the second capability information indicates that the first cell does not meet the service indicator, and the sixth capability information indicates that the data network with which the terminal device registers does not include the second cell, generating a recovery policy including communication network handover, where a communication network before handover and a communication network after handover use different radio access technologies RATs.

In a possible design, the network status information includes one or more of the following: first load status information, where the first load status information is used to represent a load status of the first access network device; second load status information, where the second load status information is used to represent a load status of a first cell; third load status information, where the third load status information is used to represent a load status of the first user plane network element; fourth load status information, where the fourth load status information is used to represent a load status of the application server; fifth load status information, where the fifth load status information is used to indicate whether a data network with which the terminal device registers includes a user plane network element that is not congested; or sixth load status information, where the sixth load status information is used to indicate whether a data network with which the terminal device registers includes a cell that is not congested.

In a possible design, the device for executing the recovery policy is the terminal device, and generating the recovery policy based on the network transmission information includes: if the first load status information indicates that the first access network device is congested and the third load status information indicates that the first user plane network element is not congested, generating a recovery policy including access network device handover; if the second load status information indicates that the first cell is congested and the third load status information indicates that the first user plane network element is not congested, generating a recovery policy including cell handover; if the third load status information indicates that the first user plane network element is congested and the fifth load status information indicates that the data network with which the terminal device registers does not include the second user plane network element, generating a recovery policy including protocol data unit PDU session re-establishment; if the second load status information indicates that the first cell is congested and the sixth load status information indicates that the data network with which the terminal device registers does not include the second cell, generating a recovery policy including communication network handover, where a communication network before handover and a communication network after handover use different radio access technologies RATs; or if the fourth load status information indicates that the application server that provides a service for the terminal device is congested, generating a recovery policy including application layer processing.

In a possible design, the device for executing the recovery policy is the first access network device, and generating the recovery policy based on the network transmission information includes: if the first load status information indicates that the first access network device is congested and the third load status information indicates that the first user plane network element is not congested, generating a recovery policy including access network device handover; if the second load status information indicates that the first cell is congested and the third load status information indicates that the first user plane network element is not congested, generating a recovery policy including cell handover; or if the second load status information indicates that the first cell is congested and the sixth load status information indicates that the data network with which the terminal device registers does not include the second cell, generating a recovery policy including communication network handover, where a communication network before handover and a communication network after handover use different radio access technologies RATs.

According to a fourth aspect, this application further provides an apparatus. The apparatus may be a terminal device. The apparatus has a function of implementing the terminal device in the first aspect or each possible design example of the first aspect, the second aspect or each possible design example of the second aspect, and the third aspect or each possible design example of the third aspect. The function may be implemented by hardware, or may be implemented by hardware executing corresponding software. The hardware or the software includes one or more modules corresponding to the foregoing function.

In a possible design, a structure of the apparatus includes a transceiver unit and a processing unit. These units may perform corresponding functions of the terminal device in the first aspect or each possible design example of the first aspect, the second aspect or each possible design example of the second aspect, and the third aspect or each possible design example of the third aspect. For details, refer to detailed descriptions in the method examples. Details are not described herein again.

In a possible design, a structure of the apparatus includes a transceiver and a processor, and optionally further includes a memory. The transceiver is configured to receive and send data or information, and is configured to communicate and interact with another device in a communication system. The processor is configured to support the apparatus in performing corresponding functions of the terminal device in the first aspect or each possible design example of the first aspect, the second aspect or each possible design example of the second aspect, and the third aspect or each possible design example of the third aspect. The memory is coupled to the processor, and stores program instructions and data that are necessary for the apparatus.

According to a fifth aspect, this application further provides an apparatus. The apparatus may be a first core network element. The apparatus has a function of implementing the first core network element in the first aspect or each possible design example of the first aspect, the second aspect or each possible design example of the second aspect, and the third aspect or each possible design example of the third aspect. The function may be implemented by hardware, or may be implemented by hardware executing corresponding software. The hardware or the software includes one or more modules corresponding to the foregoing function. The first core network element is a PCF, an NWDAF, or a session management network element.

In a possible design, a structure of the apparatus includes a transceiver unit and a processing unit. These units may perform corresponding functions of the first core network element in the first aspect or each possible design example of the first aspect, the second aspect or each possible design example of the second aspect, and the third aspect or each possible design example of the third aspect. For details, refer to detailed descriptions in the method examples. Details are not described herein again.

In a possible design, a structure of the apparatus includes a transceiver and a processor, and optionally further includes a memory. The transceiver is configured to receive and send data or information, and is configured to communicate and interact with another device in a communication system. The processor is configured to support the apparatus in performing corresponding functions of the first core network element in the first aspect or each possible design example of the first aspect, the second aspect or each possible design example of the second aspect, and the third aspect or each possible design example of the third aspect. The memory is coupled to the processor, and stores program instructions and data that are necessary for the apparatus.

According to a sixth aspect, an embodiment of this application provides a communication system, and the communication system may include the terminal device, the PCF, the NWDAF, and the session management network element mentioned above.

According to a seventh aspect, an embodiment of this application provides a computer-readable storage medium. The computer-readable storage medium stores program instructions. When the program instructions are run on a computer, the computer is enabled to perform the method according to any one of the first aspect in embodiments of this application or the possible designs of the first aspect. For example, the computer-readable storage medium may be any usable medium accessible to the computer. The following provides an example but does not impose a limitation: The computer-readable medium may include a non-transient computer-readable medium, a random-access memory (RAM), a read-only memory (ROM), an electrically erasable programmable read-only memory (EEPROM), a CD-ROM or another optical disc storage, a magnetic disk storage medium or another magnetic storage device, or any other medium that can be used to carry or store expected program code in a form of an instruction or a data structure and can be accessed by the computer.

According to an eighth aspect, an embodiment of this application provides a computer program product including computer program code and instructions. When the computer program product runs on a computer, the computer is enabled to perform the method according to any aspect.

According to a ninth aspect, this application further provides a chip. The chip is coupled to a memory, and is configured to read and execute program instructions stored in the memory, to implement any one of the foregoing methods.

For all aspects in the fourth aspect to the eighth aspect and technical effects that may be achieved in each aspect, refer to descriptions of technical effects that can be achieved in the possible solutions in the first aspect, the second aspect, or the third aspect. Details are not described herein again.

DETAILED DESCRIPTION OF ILLUSTRATIVE EMBODIMENTS

Figure 1:
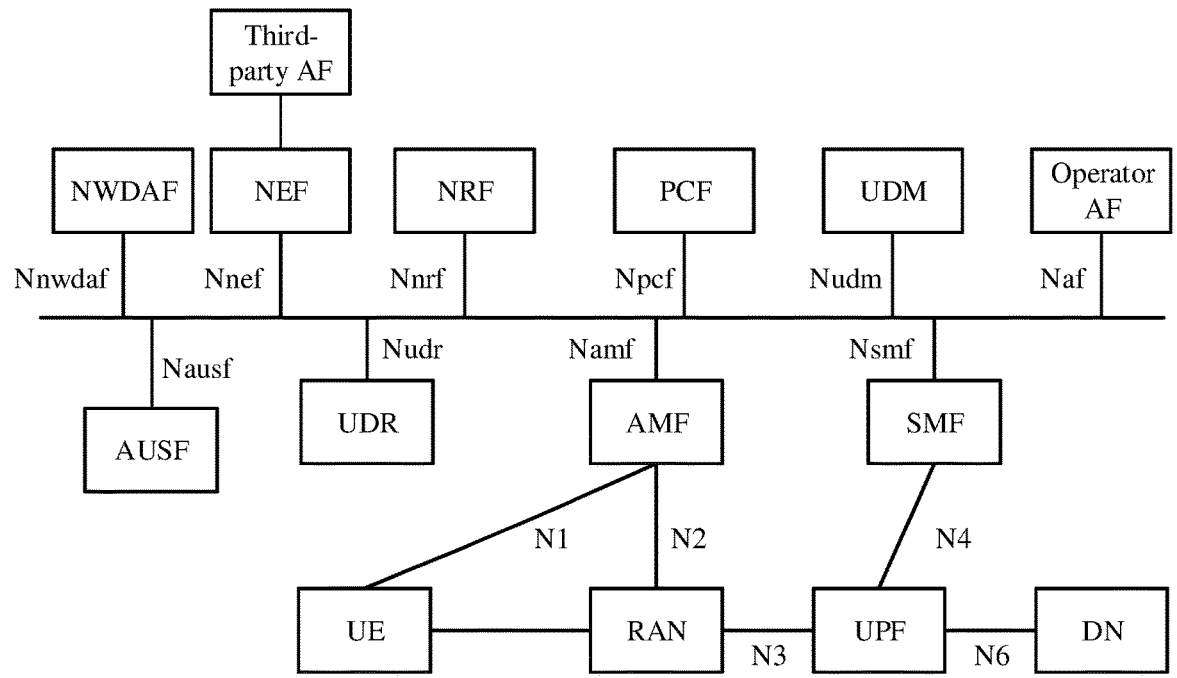
FIG. 1 is a schematic diagram of a possible architecture of a communication network according to an embodiment of this application.

Embodiments of this application may be applied to a fourth generation mobile communication technology (4G) network architecture, for example, a long term evolution (LTE) system, or may be applied to a fifth generation mobile communication technology (5G) network architecture, for example, an NR system, a future sixth generation mobile communication technology network architecture, or another similar communication system. This is not specifically limited.

The following first describes technical terms used in embodiments of this application.

(1) An access network (AN) device may also be referred to as a radio access network (RAN) device, for example, a base station (such as an access point), and may be a device that communicates with a wireless terminal device over an air interface in an access network by using one or more cells. For example, a network device in a vehicle-to-everything (vehicle-to-everything, V2X) technology is a road side unit (RSU). The base station may be configured to perform mutual conversion between a received over-the-air frame and an IP packet and serve as a router between the terminal device and a remaining part of the access network. The remaining part of the access network may include an IP network. The RSU may be a fixed infrastructure entity supporting a V2X application, and may exchange messages with another entity supporting the V2X application. The network device may further coordinate attribute management on the air interface. For example, the network device may include an evolved NodeB (NodeB, eNB, or e-NodeB, evolved NodeB) in an LTE system or a long term evolution-advanced (long term evolution-advanced, LTE-A) system, or may include a next generation NodeB (gNB) in a fifth generation (5G) NR system (also referred to as an NR system for short), or may include a centralized unit (CU) and a distributed unit (DU) in a cloud radio access network (Cloud RAN) system. This is not limited in embodiments of this application.

In embodiments of this application, an apparatus configured to implement a function of the access network device may be the access network device, or may be an apparatus, for example, a chip or a chip system, that can support the access network device in implementing the function. The apparatus may be mounted in the access network device. In the technical solutions provided in embodiments of this application, an example in which an apparatus configured to implement a function of the access network device is the access network device is used to describe the technical solutions provided in embodiments of this application.

(2) The terminal device includes a device that provides voice and/or data connectivity for a user, and specifically, includes a device that provides voice for a user, or includes a device that provides data connectivity for a user, or includes a device that provides voice and data connectivity for a user. For example, the terminal device may include a handheld device having a wireless connection function, or a processing device connected to a wireless modem. The terminal device may communicate with a core network by using a RAN, exchange voice or data with the RAN, or exchange voice and data with the RAN. The terminal device may include user equipment (UE), a wireless terminal device, a mobile terminal device, a device-to-device (D2D) terminal device, a vehicle-to-everything (V2X) terminal device, a machine-to-machine/machine-type communications (M2M/MTC) terminal device, an internet of things (IoT) terminal device, a subscriber unit, a subscriber station (subscriber station), a mobile station, a remote station, an access point (AP), a remote terminal, an access terminal, a user terminal, a user agent (user agent), a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may include a personal communication service (PCS) phone, a cordless phone, a session initiation protocol (SIP) phone, a wireless local loop (WLL) station, and a personal digital assistant (PDA). The terminal device further includes a limited device, for example, a device with relatively low power consumption, a device with a limited storage capability, or a device with a limited computing capability. For example, the terminal device includes information sensing devices such as a barcode, radio frequency identification (RFID), a sensor, a global positioning system (GPS), and a laser scanner.

As an example instead of a limitation, in embodiments of this application, the terminal device may alternatively be a wearable device. The wearable device may also be referred to as a wearable intelligent device, an intelligent wearable device, or the like, and is a generic term for wearable devices that are developed based on intelligent design of daily wearing by using wearable technologies, such as glasses, gloves, watches, clothes, and shoes. The wearable device is a portable device that is directly worn on a body or integrated into clothes or an accessory of a user. The wearable device is more than a hardware device. The wearable device implements powerful functions through software support, data exchange, and cloud interaction. Generalized wearable intelligent devices include full-featured and large-size devices that can implement complete or partial functions without depending on smartphones, for example, smart watches or smart glasses, and devices that focus on only one type of application and need to work with other devices such as smartphones, for example, various smart bands, smart helmets, or smart jewelry for monitoring physical signs.

If various terminal devices described above are located on a vehicle (for example, placed in the vehicle or installed in the vehicle), the terminal devices may be considered as vehicle-mounted terminal devices. For example, the vehicle-mounted terminal devices are also referred to as on board units (OBUs).

In embodiments of this application, the terminal device may further include a relay (relay). Alternatively, any device that can perform data communication with the base station may be considered as a terminal device.

In embodiments of this application, an apparatus configured to implement a function of the terminal device may be the terminal device, or may be an apparatus, for example, a chip or a chip system, that can support the terminal device in implementing the function. The apparatus may be installed in the terminal device. In embodiments of this application, the chip system may include a chip, or may include a chip and another discrete component. In the technical solutions provided in embodiments of this application, an example in which an apparatus configured to implement a function of the terminal device is the terminal device is used to describe the technical solutions provided in embodiments of this application.

(3) A "network element" in embodiments of this application may also be referred to as a "device". This is not limited in this application. The network element may be hardware, or may be software obtained through functional division, or a structure of a combination thereof. The network element may include a core network element, an access network element (or referred to as an access network device), and the like. The core network element includes, for example, a mobility management network element and a session management network element.

The mobility management network element may include an access and mobility management entity (AMF) in 5G, or a control plane function (SGW-C) and a mobility management entity (MME) of a serving gateway (SGW) in 4G, or all or some of control functions formed after the foregoing network elements are combined. The mobility management network element is responsible for access and mobility management of a terminal device in a mobile network. In future communication (for example, in 6G or another network), the mobility management network element may still be an AMF network element or have another name. This is not limited in this application.

The session management network element may be a session management function (SMF) network element in 5G, a user plane function (SGW-U) of the serving gateway in 4G, or all or some of control functions formed after the foregoing network elements are combined.

(4) Terms "system" and "network" may be used interchangeably in this specification. The term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between associated objects. The term "at least one" in this application means one or more, that is, includes one, two, three, or more; and the term "a plurality of" means two or more, that is, includes two, three, or more. "At least one of the following items (pieces)" or a similar expression thereof indicates any combination of these items, including any combination of a single item (piece) or a plurality of items (pieces). For example, at least one item (piece) of a, b, and c may indicate: a, b, c, a and b, a and c, b and c, or a, b, and c, where a, b, and c may be singular or plural. It should be understood that in embodiments of this application, "B corresponding to A" indicates that B is associated with A, and B may be determined based on A. However, it should be further understood that determining B based on A does not mean that B is determined based on only A, and B may be determined based on A and/or other information. In addition, unless otherwise stated, in embodiments of this application, ordinal numbers such as "first" and "second" are used to distinguish between a plurality of objects, and are not intended to limit an order, a time sequence, a priority, or importance of the plurality of objects. In addition, the terms "include" and "have" in embodiments, claims, and accompanying drawings of this application are not exclusive. For example, a process, a method, a system, a product, or a device that includes a series of steps or modules is not limited to the listed steps or modules, and may further include steps or modules that are not listed.

Figure 2:
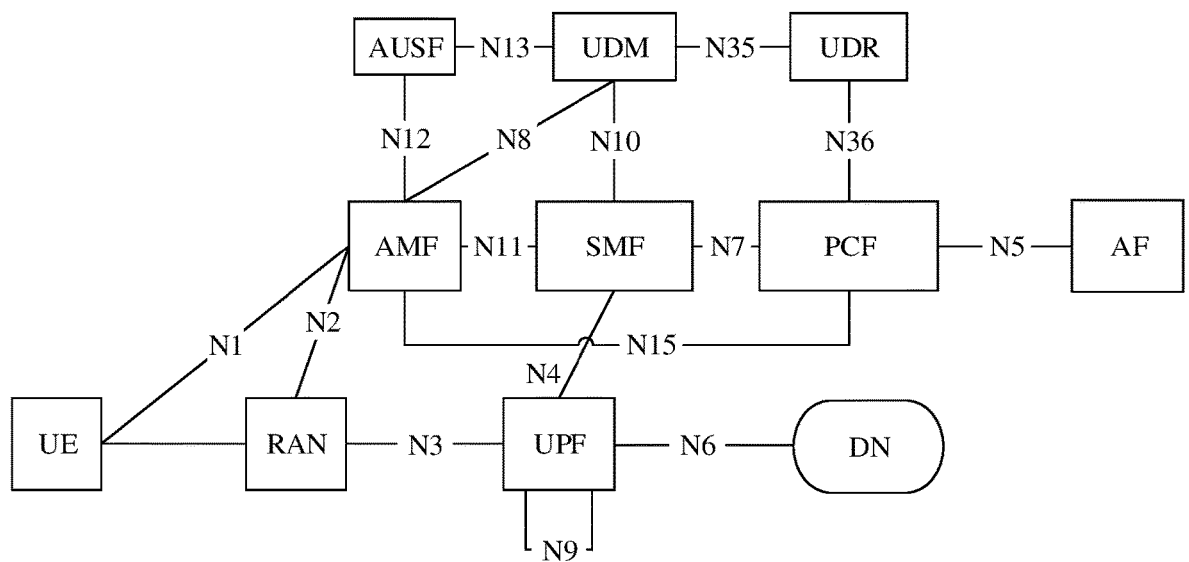
FIG. 2 is a schematic diagram of another possible architecture of a communication network according to an embodiment of this application.

FIG. 1 and FIG. 2 are schematic diagrams of two possible architectures of a communication network according to embodiments of this application. An architecture of a communication network may include three parts: a terminal device part, a data network (DN) part, and an operator network part. The following briefly describes functions of some network elements.

The operator network may include one or more of the following network elements: an authentication server function (AUSF) network element, a network exposure function (NEF) network element, a policy control function (PCF) network element, a unified data management (UDM) network element, a unified data repository (UDR) network element, a network repository function (NRF) network element, an application function (AF) network element, an access and mobility management function (AMF) network element, a session management function (SMF) network element, a RAN network element, a user plane function (UPF) network element, a unified data repository (UDR) network element, a network data analytics function (NWDAF) network element, and the like. In the foregoing operator network, a part other than a radio access network part may also be referred to as a core network part.

The following briefly describes functions of the foregoing network elements.

The AMF network element is responsible for mobility management of a user, including mobility status management, temporary user identity allocation, and user authentication and authorization.

The SMF network element is responsible for UPF network element selection, UPF network element reselection, internet protocol (IP) address allocation, bearer establishment, modification, and release, and QoS control.

The PCF network element includes functions of policy control decision and flow-based charging control, and includes a user subscription data management function, a policy control function, a charging policy control function, QoS control, and the like.

The UDM network element is responsible for managing subscription data, and notifying a corresponding network element when the subscription data is modified.

The UDR network element is responsible for storing and retrieving subscription data, policy data, common architecture data, and the like, and is used by the UDM, the PCF, and the NEF to obtain related data. The UDR needs to provide different data access authentication mechanisms for different types of data, such as subscription data and policy data, to ensure data access security. For an invalid service-oriented operation or a data access request, the UDR needs to return a failure response with a proper cause value.

The AF network element is configured to provide an application layer service for the UE. When providing the service for the UE, the AF has requirements on a quality of service QoS policy and a charging policy, and needs to notify the network. In addition, the AF also needs application-related information fed back by another network element in the core network.

The NEF network element mainly supports a network capability exposure function, and exposes a network capability and a service to the outside. A 3rd generation partnership project (3GPP) network function (NF) releases a function and an event to another NF through the NEF. The capability and the event exposed by the NF can be securely exposed to a third-party application. The NEF uses a standard interface (Nudr) of the UDR to store and retrieve structured data, and translates exchange information of the AF and exchange information of an internal network function, for example, performs conversion between AF-service (Service)-identifier (Identifier) and internal 5G core information. The internal 5G core information may be, for example, a data network name (DNN) or single network slice selection assistance information (S-NSSAI).

The UPF network element supports all or some of the following functions: interconnecting a protocol data unit (PDU) session with a data network; a packet routing and forwarding function, for example, supporting forwarding of traffic to the data network after performing downlink offloading (uplink classifier) on the traffic; supporting a branching point function to support a multi-homed PDU session; and a data packet detection function.

The AUSF network element is responsible for an authentication function and is responsible for executing a network slice specific authentication and authorization (NSSAA) procedure.

The NWDAF network element is configured to perform signaling interaction with another core network element to learn a network status. The core network element may subscribe to the NWDAF to learn the network status.

A UE radio capability management function (UCMF) is used to store dictionary entries corresponding to UE radio capability IDs assigned by a public land mobile network (PLMN) or a manufacturer. The AMF may subscribe to the UCMF to obtain new values of UE radio capability IDs allocated by the UCMF from the UCMF and cache them locally.

An OAM network element can cover the network elements of the access network and the core network, and can collect data from the network elements of the access network and the core network.

It should be noted that, in FIG. 1, both a third-party (3rd) AF network element and an operator AF belong to the AF network element. A difference lies in that the 3rd AF network element (for example, a WeChat service server or an Alipay payment service server) is not controlled by an operator, the operator AF network element (for example, a proxy-call session control function (P-CSCF) network element in an IP multimedia system) is controlled by the operator, and the 3rd AF network element needs to interact with the NWDAF network element by using the NEF network element.

In addition, for brevity of description, in subsequent description, "network elements" in functional network elements are removed. For example, the PCF network element is referred to as a PCF for short, and the SMF network element is referred to as an SMF for short. Other network elements are similar, and are not enumerated one by one.

FIG. 1 is a schematic diagram of an architecture of a communication network based on a service-based architecture. In FIG. 1, any two network elements between an NEF, an NRF, a PCF, a UDM, an AUSF, a UDR, an AMF, and an SMF may communicate with each other in a service-based communication manner. For example, interfaces Nnef and Nausf used for communication between an NEF and an AUSF are service-based interfaces. Similarly, interfaces Nnrf, Npcf, Nudm, Naf, Nudr, Namf, and Nsmf are service-based interfaces. In addition, the AMF may communicate with a terminal device through an Ni interface, the AMF may communicate with a (R)AN through an N2 interface, the RAN may communicate with a UPF through an N3 interface, the SMF may communicate with the UPF through an N4 interface, the terminal device communicates with the RAN through an air interface, and the UPF may communicate with a DN through an N6 interface.

FIG. 2 is a schematic diagram of an architecture of a communication network based on a point-to-point interface. A main difference between FIG. 1 and FIG. 2 lies in that an interface between network elements in FIG. 2 is a point-to-point interface rather than a service-based interface. A UDSF, an NEF, an NWDAF, and an NRF are not described for the clarity of a point-to-point diagram. It should be noted that a core network element in FIG. 2 may interact with the UDSF, the NEF, the NWDAF, and the NRF as required. For clarity, an OAM network element is not shown in FIG. 1 and FIG. 2, and the OAM may collect data from an access network element and the core network element.

In a specific actual scenario, a terminal device transmits service data to an application server by using a network, and a case in which the network does not meet a transmission requirement of the service data is often encountered. A network transmission parameter that affects transmission of the service data may include a transmission delay, transmission bandwidth, a network jitter, or the like. Therefore, when the terminal device transmits the service data to the application server by using the network, due to impact of a current network transmission status, the following cases may occur but constitute no limitation:

(1) The transmission delay does not meet a delay requirement of the service data. For example, a delay of a game is required to be less than 460 ms, but the current network cannot meet the delay requirement of the game.

(2) The transmission bandwidth does not meet a bandwidth requirement of the service data. For example, when a user watches a video on the terminal device, frame freezing occurs or the video is often in a buffering state.

(3) One-way audio occurs on the network. For example, the terminal device may send the service data to the application server, but when the application server sends the service data to the terminal device, the terminal device cannot receive the service data.

When determining that the foregoing cases occur, the terminal device makes a blind attempt, for example, re-establishes a protocol data unit (PDU) session, or re-registers, or the user of the terminal device restarts a modem. When the terminal device makes a blind attempt, time for solving a problem is prolonged. Consequently, the user cannot connect to the network for long time, and service recovery time is relatively long.

Based on this, embodiments of this application provide a communication method and apparatus, to increase a service recovery speed and improve service experience of the user. The method and the apparatus in this application are based on a same technical concept. Because problem-resolving principles of the method and the apparatus are similar, mutual reference may be made to implementations of the apparatus and the method, and repeated parts are not described again.

In embodiments of this application, when determining that a network used to provide a service does not meet a transmission requirement of service data, a first communication device may request, from a first core network element, to analyze a reason why the network does not meet the transmission requirement of the service data, and the first core network element obtains information used to recover a service, and sends the information to a device that performs a service recovery operation. The information used to recover the service is used to enable the network to meet the transmission requirement of the service data. The information used to recover the service may be referred to as a recovery policy, or may be referred to as a recovery means, a recovery parameter, an acceleration policy, or the like. The name is not specifically limited in embodiments of this application. In the following description, the recovery policy is used as an example.

The following describes in detail the solutions provided in embodiments of this application with reference to the accompanying drawings.

Figure 3:
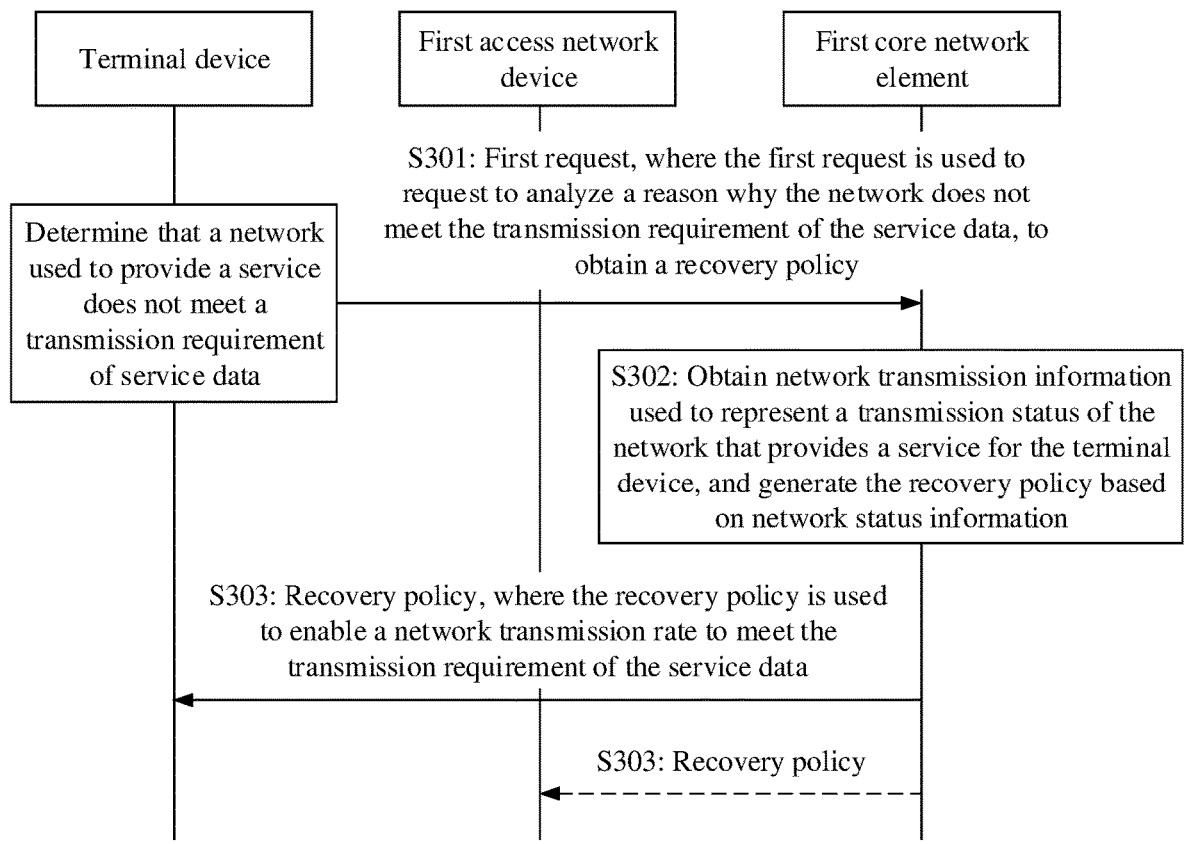
FIG. 3 is a schematic flowchart of a first possible communication method according to an embodiment of this application.

FIG. 3 is a schematic flowchart of a possible communication method, to increase a service recovery speed and improve service experience of a user.

S301: A terminal device sends a first request to a first core network element when determining that a network used to provide a service does not meet a transmission requirement of service data, where the first request is used to request a recovery policy, and the recovery policy indicates a means used to enable the network to meet the transmission requirement of the service data. Alternatively, it may be described as follows: The recovery policy is used to enable a network transmission rate to meet the transmission requirement of the service data. Alternatively, it may be described as follows: The first request is used to request to analyze a reason why the network does not meet the transmission requirement of the service data, to obtain the recovery policy.

It should be understood that the operation of S301 may be performed by the terminal device, or a processor, a chip, a chip system, a function module, or the like in the terminal device. In FIG. 3, an example in which the operation of S301 is performed by the terminal device is used.

For example, that the network used to provide the service does not meet the transmission requirement of the service data may be that a current network transmission capability does not meet the transmission requirement of the service data. The current network transmission capability may include one or more of the following: a network transmission rate, a network transmission delay, network transmission bandwidth, a network jitter, or the like. For example, when a user watches a video on the terminal device, frame freezing or buffering often occurs. This case occurs because the current network transmission capability does not meet the transmission requirement of the service data. For example, a possible cause is that transmission bandwidth of the network is less than transmission bandwidth required by the service data. For another example, when a user plays a game on the terminal device, an operation instruction sent by the user cannot be displayed on the terminal device in real time. This case also occurs because the current network transmission capability does not meet the transmission requirement of the service data. For example, a possible cause is that a network transmission delay is greater than a transmission delay required by the service data.

S302: After receiving the first request, the first core network element obtains network transmission information used to represent a transmission status of the network that provides the service for the terminal device, and generates the recovery policy based on network status information.

The first core network element analyzes, based on the network transmission information, the reason why the network does not meet the transmission requirement of the service data, and generates the recovery policy based on the reason.

S303: The first core network element sends the recovery policy to a device for executing the recovery policy. The device for executing the recovery policy may include the terminal device and/or an access network device that provides an access service for the terminal device. In subsequent description, the access network device that provides the access service for the terminal device is referred to as a first access network device.

The first core network element may be a PCF, an SMF, or an NWDAF.

In a first possible implementation, the first core network element is the PCF. The terminal device may send the first request to the PCF by using the SMF, to request the recovery policy. The PCF obtains the network status information from the NWDAF, generates the recovery policy based on the network transmission information, and sends the recovery policy to the terminal device or the access network device that provides the access service for the terminal device.

In a second possible implementation, the first core network element is the PCF. The terminal device may send the first request to the PCF by using the AMF, to request the recovery policy. The PCF obtains the network transmission information from the NWDAF, generates the recovery policy based on the network transmission information, and sends, by using the AMF, the recovery policy to the terminal device or the access network device that provides the access service for the terminal device.

In a third possible implementation, the first core network element is the SMF. The terminal device may send the first request to the SMF to request the recovery policy. The SMF obtains the network transmission information from the NWDAF, generates the recovery policy based on the network transmission information, and sends the recovery policy to the terminal device or the access network device that provides the access service for the terminal device.

In a fourth possible implementation, the first core network element is the NWDAF. The terminal device may send the first request to the NWDAF to request the recovery policy. The NWDAF obtains the network transmission information, generates the recovery policy based on the network transmission information, and sends the recovery policy to the terminal device or the access network device that provides the access service for the terminal device.

In a fifth possible implementation, the first core network element is the NWDAF. The terminal device may send the first request to the NWDAF by using an AF, to request the recovery policy. The NWDAF obtains the network transmission information, generates the recovery policy based on the network transmission information, and sends the recovery policy to the terminal device or the access network device that provides the access service for the terminal device.

In a sixth possible implementation, the first core network element is the NWDAF. The terminal device may send the first request to the NWDAF by using the SMF, to request the recovery policy. The NWDAF obtains the network transmission information, generates the recovery policy based on the network transmission information, and sends the recovery policy to the terminal device or the access network device that provides the access service for the terminal device. In subsequent description, an example in which the access network device that provides the access service for the terminal device is referred to as the first access network device is used.

In a seventh possible implementation, the first core network element is the NWDAF. The terminal device may send the first request to the NWDAF by using the AMF, to request the recovery policy. The NWDAF obtains the network transmission information, generates the recovery policy based on the network transmission information, and sends the recovery policy to the terminal device or the access network device that provides the access service for the terminal device.

Figure 4:
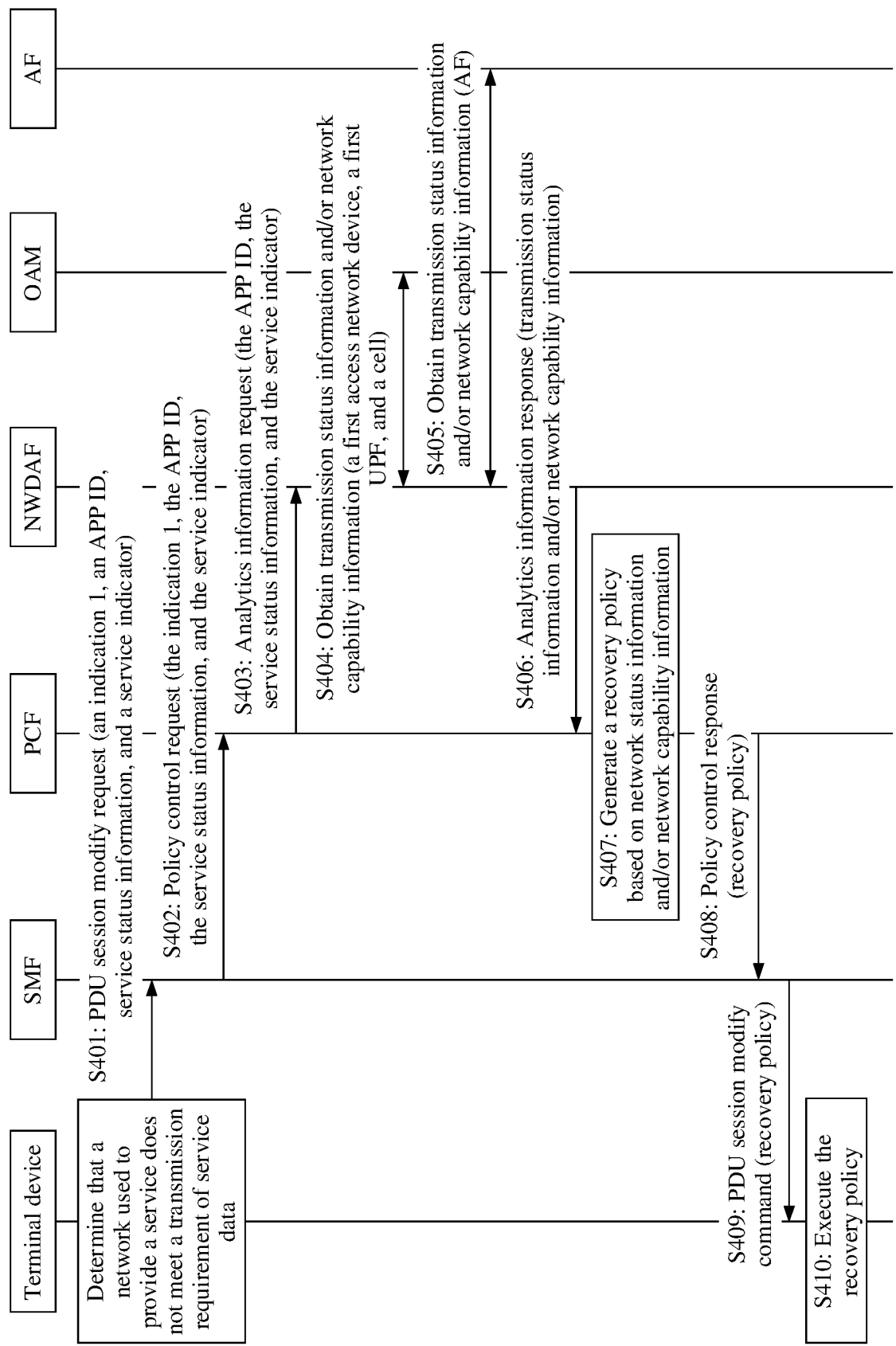
FIG. 4 is a schematic flowchart of a second possible communication method according to an embodiment of this application.
Figure 5:
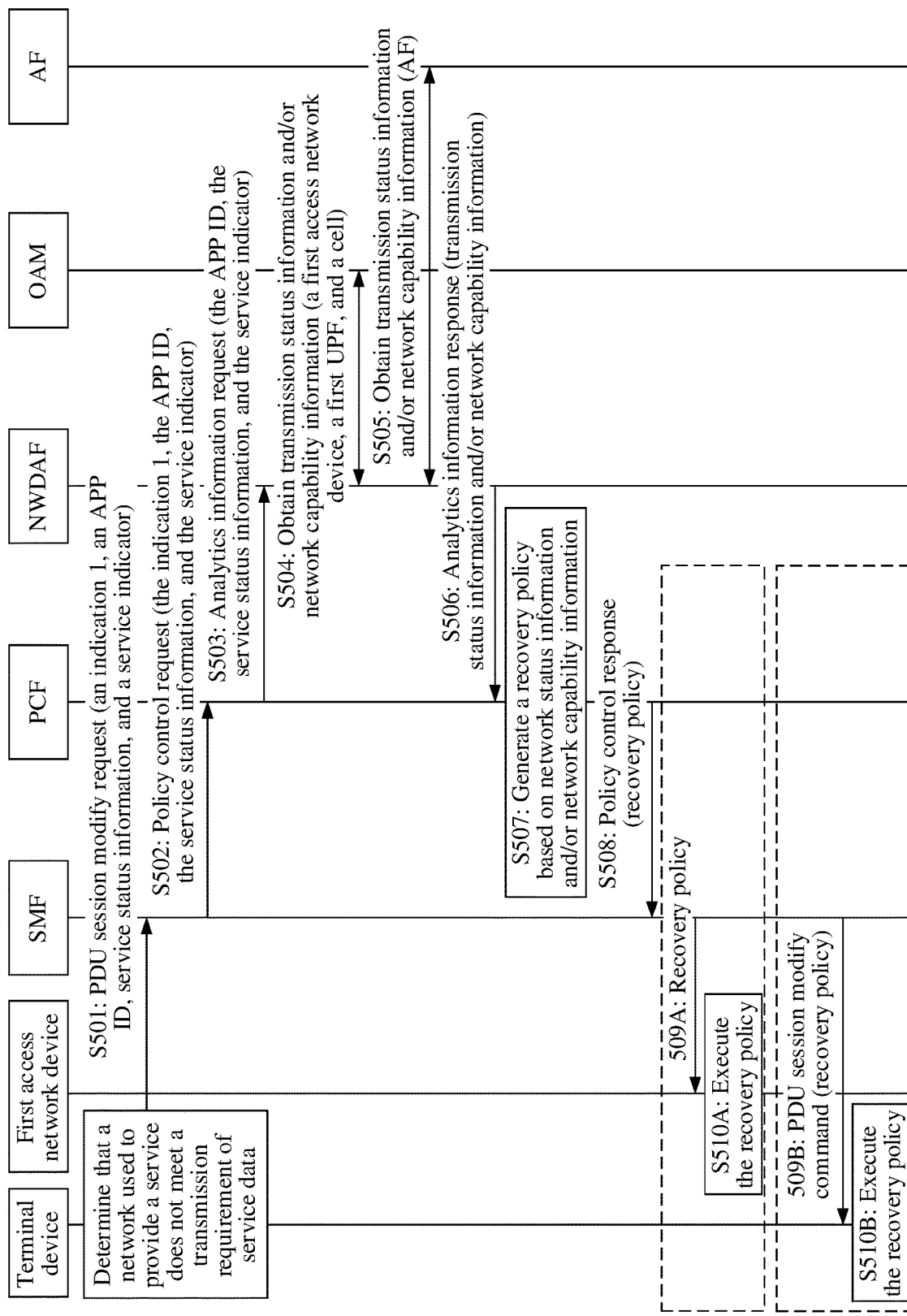
FIG. 5 is a schematic flowchart of a third possible communication method according to an embodiment of this application.

The following describes the first possible implementation in detail with reference to FIG. 4 and FIG. 5. For example, a PCF generates a recovery policy, and a terminal device requests the recovery policy from the PCF by using an SMF. In FIG. 4, an example in which a device for executing the recovery policy is the terminal device is used. In FIG. 5, an example in which devices for executing the recovery policy include the terminal device and a first access network device is used.

S401: The terminal device sends a first request to the SMF when determining that a network does not meet a transmission requirement of service data.

For example, the terminal device may send the first request to the SMF by using a PDU session modify request message. In FIG. 4, an example in which the terminal device sends the PDU session modify request to the SMF is used. In an example, the terminal device may send the PDU session modify request to the SMF by using an AMF. The PDU session modify request may carry a PDU session ID.

The first request may include an indication 1, and the indication 1 is used to indicate that the network does not meet the transmission requirement of the service data.

Optionally, the first request may further include one or more of the following:

(1) Application identifier (APP ID): The application identifier is used to identify an application to which the service data belongs. The application to which the service data belongs may be an application that currently uses a data service, or an application in a foreground of the terminal device.

(2) Service status information: The service status information is used to represent a transmission status of the service data, or it may be described as that the service status information is used to indicate a service transmission status of an application corresponding to an APP ID.

For example, the service status information may use a quality of experience (QoE) level, that is, use the QoE level to indicate the transmission status of the service data. For example, QoE=1 indicates smooth, QoE=2 indicates average, QoE=3 indicates not satisfied, and QoE=$_4$ indicates severe stalling.

The terminal device may evaluate cell QoE by using one or more evaluation indicators. The evaluation indicators include but are not limited to a network throughput rate, a transmission rate, a delay, a packet loss rate, a bit error rate, and the like. For example, the transmission rate is used as an example. When the transmission rate is high, the QoE is good. When the transmission rate is low, the QoE is poor.

A possible manner of evaluating QoE is to provide a plurality of performance labels (or may also be referred to as performance levels), for example, smooth, average, and stalling. The terminal device marks different performance labels for cells based on evaluation indicators (such as delays and transmission rates) of the cells. In other words, a process of evaluating QoE of a cell may be understood as a process of marking a performance label for the cell.

A plurality of evaluation indicators, such as a transmission rate, a delay, a packet loss rate, and bandwidth, can be used independently or in combination. For example, the delay is used independently as an example. When determining that the delay is less than a first threshold, the terminal device determines that the performance label of the cell is smooth. When determining that the delay is within a range from a second threshold to the first threshold, the terminal device determines that the performance label of the cell is average. When determining that the delay is greater than the second threshold, the terminal device determines that the performance label of the cell is stalling. The first threshold is less than the second threshold.

In an example, when determining that at least one of the following conditions is met, the terminal device determines that the performance label of the cell is smooth. The conditions include but are not limited to: the delay is less than a delay threshold 1, the packet loss rate is less than a packet loss rate threshold 1, the transmission bandwidth is greater than a bandwidth threshold 1, and the like. In another example, when determining that at least one of the following conditions is met, the terminal device determines that the performance label of the cell is stalling. The conditions include but are not limited to: the delay is greater than a delay threshold 2, the packet loss rate is greater than a packet loss rate threshold 2, the transmission bandwidth is less than a bandwidth threshold 2, and the like.

Certainly, in addition to the four performance labels: smooth, average, not satisfied, and severe stalling, the terminal device further sets more labels, for example, stalling, very smooth, and average smooth, or the terminal device sets different thresholds as determining conditions. Certainly, the terminal device may alternatively set only two types of performance labels, for example, smooth and stalling.

(3) Service indicator: The service indicator is used to represent the transmission requirement of the service data. The service indicator may include one or more of a delay, bandwidth, a packet loss rate, a bit error rate, a jitter, or the like.

S402: The SMF sends the first request to a PCF.

For example, the SMF may send the first request to the PCF by using a policy control request message. In FIG. 4, an example in which the SMF sends a policy control request to the PCF is used.

When the policy control request message includes the first request, the policy control request message may further include parameters such as an identifier of an access network device and an identifier of a UPF. For example, if the access network device is a gNB, the identifier of the access network device may be a gNB ID. The identifier of the UPF may be a UPF instance (instance ID). The identifier of the access network device is used to identify an access network device on which the terminal device currently camps. In subsequent description, for example, the access network device on which the terminal device currently camps is referred to as the first access network device. The identifier of the UPF is used to identify a UPF that currently provides a service for the terminal device. In subsequent descriptions, for example, the UPF that currently provides a service for the terminal device is referred to as a first UPF.

S403: The PCF sends a second request to an NWDAF. The second request is used to request network transmission information, and the network transmission information is used to represent a transmission status of a network that provides a service for the terminal device.

For example, the network transmission information may include network status information and/or network capability information. The network status information is used to represent a transmission status of a network element in the network that provides a service for the terminal device, and the network capability information is used to represent a service processing capability of the network element in the network that provides a service for the terminal device. The network element in the network that provides a service for the terminal device may include, for example, the first access network device that provides a service for the terminal device, a first user plane network element that provides a user plane service for the terminal device, a cell accessed by the terminal device, or an application server that provides a service for the terminal device.

For example, the second request may be an analytics information request (Nnwdaf_Analyticsinfo Request) message. The Nnwdaf_Analyticsinfo Request may carry one or more of an identifier of the terminal device or the service indicator. Optionally, the Nnwdaf_Analyticsinfo Request may further carry an APP ID. The analytics information request message may further include a type (Type). Type=congestion information, used to indicate a purpose of sending an analytics information message.

In some embodiments, the second request may further include an identifier of the first access network device, and the network element in the network that provides a service for the terminal device includes the first access network device. The second request may include an identifier of the first user plane network element, and the network element in the network that provides a service for the terminal device includes the first user plane network element. The second request may include an APP ID, and the network element that provides a service for the terminal device includes the application server that provides a service for the terminal device.

S404: The NWDAF obtains, from an OAM, transmission status information and/or transmission capability information, for example, a load status, of the first access network device, the first user plane network element, or a cell accessed by the terminal device.

In some embodiments, the NWDAF sends a third request to the OAM. The third request includes the identifier of the first access network device and the identifier of the first user plane network element. Further, after receiving the third request, the OAM sends a load status of the first access network device and a load status of the first user plane network element to the NWDAF. The load status of the first access network device may include the load status of the first access network device and/or a load status of each cell of the first access network device.

In some other embodiments, the third request may further carry the service indicator. Further, after receiving the service indicator, the OAM may determine whether the first access network device meets the transmission requirement of the service data indicated by the service indicator (which may be explained as whether a service processing capability of the first access network device meets the service indicator), and determine whether the first user plane network element meets the transmission requirement of the service data indicated by the service indicator (which may be explained as whether a service processing capability of the first user plane network element meets the service indicator). Further, the OAM may generate capability information of the first access network device, for example, referred to as first capability information. The first capability information indicates whether the service processing capability of the first access network device meets the service indicator. The OAM generates capability information of a first cell accessed by the terminal device, which may be referred to as second capability information. The second capability information indicates whether a service processing capability of the first cell meets the service indicator. The OAM generates capability information of the first user plane network element, which may be referred to as third capability information. The third capability information indicates whether the service processing capability of the first user plane network element meets the service indicator. For example, the service indicator includes a delay, bandwidth, or a jitter. The delay is used as an example. The OAM determines whether a delay supported by the first access network device (or the first cell or the first user plane network element) can meet a delay required by the terminal device.

In still some embodiments, when determining that the service processing capability of the first access network device (or the first cell) does not meet the service indicator, the OAM may determine whether a data network with which the terminal device registers includes a second cell whose service processing capability meets the service indicator. The OAM may send sixth capability information to the NWDAF. The sixth capability information indicates whether the data network with which the terminal device registers includes the second cell whose service processing capability meets the service indicator. For example, the OAM may further add an identifier of the second cell to the sixth capability information, and send the sixth capability information to the NWDAF.

In still some embodiments, when determining that the service processing capability of the first user plane network element does not meet the service indicator, the OAM may determine whether the data network with which the terminal device registers includes a second user plane network element whose service processing capability meets the service indicator. The OAM may send fifth capability information to the NWDAF. The fifth capability information indicates whether the data network with which the terminal device registers includes the second user plane network element whose service processing capability meets the service indicator.

Optionally, the second request may further include an APP ID. The NWDAF further performs S405.

In a possible implementation, the NWDAF may obtain, from the first access network device, a transmission status of the first access network device and/or whether the service processing capability of the first access network device meets the service indicator. The NWDAF may obtain, from the first UPF, a transmission status of the first UPF and/or whether a service processing capability of the first UPF meets the service indicator.

In an optional manner, when learning, from the first UPF, that the first UPF is congested, the NWDAF may determine, from the OAM, whether there is an access network device that is not congested. When learning, from the first UPF, that the service processing capability of the first UPF does not meet the service indicator, the NWDAF may determine, from the OAM, whether there is an access network device that meets the service indicator.

S405: The NWDAF obtains, based on an APP ID, an address of an application server (AF) corresponding to the APP, and requests transmission status information and/or transmission capability information of the AF from the AF based on the address of the AF. Specifically, the NWDAF may send event exposure subscription to the AF. The event exposure subscription includes but is not limited to Nnf_EventExposureSubscribe. The event exposure subscription is used to subscribe to a load status of the AF. The AF sends an event exposure notification to the NWDAF. The event exposure notification includes but is not limited to Nnf_EventExposureNotify. Nnf_EventExposureNotify includes load status information of the AF.

In a possible example, before requesting the load status of the AF from the AF based on the address of the AF, the NWDAF may send a query request to the UPF, to request to query an IP 5-tuple used by the terminal device. Therefore, the UPF sends, to the NWDAF, the IP 5-tuple used by the terminal device. The IP 5-tuple includes a source IP address, a destination IP address, a protocol number, a source port number, and a destination port number. The NWDAF may obtain the address of the AF based on the IP 5-tuple used by the terminal device. The address of the AF may include an IP address and a port number of the AF, for example, the destination IP address and the destination port number in the IP 5-tuple. The NWDAF may determine, based on the port number, a service currently processed by the terminal device. Different port numbers on the AF may correspond to different services. For example, a port 1 is used to provide a chat service, and a port 2 is used to provide a game service. When requesting the load status of the AF from the AF based on the address of the AF, the NWDAF may send the IP 5-tuple to the AF, so that the AF determines, based on the IP 5-tuple, a service currently provided by the AF for the terminal device, further determines a load status of a resource providing the service, and sends the load status to the NWDAF.

In another possible example, the NWDAF may further send the service indicator (for example, carried in the event exposure subscription) to the AF. Further, after receiving the service indicator, the AF may determine whether a service processing capability of the AF meets the transmission requirement of the service data, that is, whether the service processing capability of the AF meets the service indicator. Further, the AF may generate capability information of the AF, for example, referred to as fourth capability information. The fourth capability information indicates whether the service processing capability of the application server meets the service indicator. Nnf_EventExposureNotify may include the fourth capability information.

The NWDAF obtains, by using the foregoing steps S404 and S405, a transmission status of the network element in the network that provides a service for the terminal device, and obtains the network status information through aggregation. For example, the network status information may include one or more of the following first load status information to sixth load status information. The first load status information is used to represent the load status of the first access network device. The second load status information is used to represent a load status of the first cell. The third load status information is used to represent the load status of the first user plane network element. The fourth load status information is used to represent the load status of the application server. The fifth load status information is used to indicate whether the data network with which the terminal device registers includes a second user plane network element that is not congested. The sixth load status information is used to indicate whether the data network with which the terminal device registers includes a second cell that is not congested.

The NWDAF may further obtain, by using the foregoing steps S404 and S405, the service processing capability of the network element in the network that provides a service for the terminal device, and further obtain the network capability information through aggregation. The network capability information includes one or more of the first capability information to the sixth capability information.

S406: The NWDAF sends the network status information and/or the network capability information to the PCF.

The NWDAF may send the network status information and/or the network capability information to the SMF by using an Nnwdaf_Analyticsinfo Response.

S407: The PCF generates the recovery policy based on the network status information and/or the network capability information.

Further, the PCF sends the recovery policy to the terminal device by using the SMF. For example, the recovery policy is sent to the terminal device by using S408 and S409.

In a possible implementation, the PCF generates the recovery policy based on the network status information. The following describes several manners in which the NWDAF generates the recovery policy based on the network status information.

In an example, if the first load status information indicates that the first access network device is congested and the third load status information indicates that the first user plane network element is not congested, the NWDAF generates a recovery policy including access network device handover.

In another example, if the second load status information indicates that the first cell is congested and the third load status information indicates that the first user plane network element is not congested, the NWDAF generates a recovery policy including cell handover.

In still another example, if the third load status information indicates that the first user plane network element is congested and the fifth load status information indicates that the data network with which the terminal device registers does not include the second user plane network element, the NWDAF generates a recovery policy including protocol data unit PDU session re-establishment.

In yet another example, if the second load status information indicates that the first cell is congested and the sixth load status information indicates that the data network with which the terminal device registers does not include the second cell, the NWDAF generates a recovery policy including communication network handover. A communication network before handover and a communication network after handover use different radio access technologies RATs.

In still yet another example, if the fourth load status information indicates that the application server that provides a service for the terminal device is congested, the NWDAF generates a recovery policy including application layer processing.

Optionally, the generated recovery policy may include one or more items. For example, if the first load status information indicates that the first access network device is congested, the third load status information indicates that the first user plane network element is not congested, and the fourth load status information indicates that the application server that provides a service for the terminal device is congested, the recovery policy may include cell handover and application layer processing.

In another possible implementation, the PCF generates the recovery policy based on the network capability information. The following describes several manners in which the NWDAF generates the recovery policy based on the network capability information.

In an example, if the first capability information indicates that the first access network device does not meet the service indicator, and the third capability information indicates that the first user plane network element meets the service indicator, the NWDAF generates the recovery policy including access network device handover.

In another example, if the second capability information indicates that the first cell does not meet the service indicator, and the third capability information indicates that the first user plane network element meets the service indicator, the NWDAF generates the recovery policy including cell handover.

In still another example, if the third capability information indicates that the first user plane network element does not meet the service indicator, and the fifth capability information indicates that the data network with which the terminal device registers includes the second user plane network element, the NWDAF generates the recovery policy including protocol data unit PDU session re-establishment.

In yet another example, if the second capability information indicates that the first cell does not meet the service indicator, and the sixth capability information indicates that the data network with which the terminal device registers does not include the second cell, the NWDAF generates the recovery policy including communication network handover. A communication network before handover and a communication network after handover use different radio access technologies RATs.

In still yet another example, if the fourth capability information indicates that the application server that provides a service for the terminal device does not meet the service indicator, the NWDAF generates the recovery policy including application layer processing.

Optionally, the generated recovery policy may include one or more items. For example, if the first capability information indicates that the first access network device does not meet the service indicator, the third capability information indicates that the first user plane network element meets the service indicator, and the fourth capability information indicates that the application server that provides a service for the terminal device does not meet the service indicator, the recovery policy may include cell handover and application layer processing.

In still another possible implementation, the PCF generates the recovery policy based on the network capability information and the network status information. The following describes several manners in which the PCF generates the recovery policy based on the network capability information and the network status information.

In an example, if the first load status information indicates that the first access network device is congested, the third load status information indicates that the first user plane network element is not congested, and the third capability information indicates that the first user plane network element meets the service indicator, the PCF generates the recovery policy including access network device handover.

In another example, if the first capability information indicates that the first access network device does not meet the service indicator, the third load status information indicates that the first user plane network element is not congested, and the third capability information indicates that the first user plane network element meets the service indicator, the PCF generates the recovery policy including access network device handover.

In still another example, if the second load status information indicates that the first cell is congested, the third load status information indicates that the first user plane network element is not congested, and the third capability information indicates that the first user plane network element meets the service indicator, the PCF generates the recovery policy including cell handover.

In yet another example, if the second capability information indicates that the service processing capability of the first cell does not meet the service indicator, the third load status information indicates that the first user plane network element is not congested, and the third capability information indicates that the first user plane network element meets the service indicator, the PCF generates the recovery policy including cell handover.

In still yet another example, if the third load status information indicates that the first user plane network element is congested and the fifth load status information indicates that the data network with which the terminal device registers does not include the second user plane network element, the PCF generates the recovery policy including protocol data unit PDU session re-establishment.

In a further example, if the second load status information indicates that the first cell is congested and the sixth load status information indicates that the data network with which the terminal device registers does not include the second cell, the PCF generates the recovery policy including communication network handover. A communication network before handover and a communication network after handover use different radio access technologies RATs.

In a still further example, if the fourth load status information indicates that the application server that provides a service for the terminal device is congested, the PCF generates the recovery policy including application layer processing.

In a possible implementation, before determining the recovery policy, the PCF may request a radio capability of the terminal device from a UCMF, to be specific, obtain, from the UCMF, a radio access type (RAT) supported by the terminal device and a radio frequency selection priority (FSP). For example, an index to RAT may be 1, 2, or 3. 1 indicates 5G, 2 indicates 4G, and 3 indicates 3G. Therefore, the PCF obtains the radio access type supported by the terminal device. Further, for example, when it is determined that the 4G network is currently used, the recovery policy is communication network handover. When it is determined that the terminal device supports 5G, the recovery policy may include handover to the 5G network.

S408: The PCF sends a policy control response message to the SMF. The policy control response message includes the recovery policy. The policy control response message may further include a reason why the network does not meet the transmission requirement of the service data.

S409: The SMF sends a PDU session modify command to the terminal device. The PDU session modify command includes the recovery policy. The PDU session modify command may further include the reason why the network does not meet the transmission requirement of the service data.

S410: The terminal device executes the recovery policy.

When there are a plurality of recovery policies in this embodiment of this application, the terminal device may perform one or more of the plurality of recovery policies. In an example, the terminal device may execute one of the recovery policies. If the network meets the transmission requirement of the service data after executing the recovery policy, the terminal device may no longer execute another recovery policy in the recovery policies. After one recovery policy is executed, if the network still does not meet the transmission requirement of the service data, the terminal device continues to execute a second recovery policy until the network meets the transmission requirement of the service data or all recovery policies are executed.

Figure 4A:
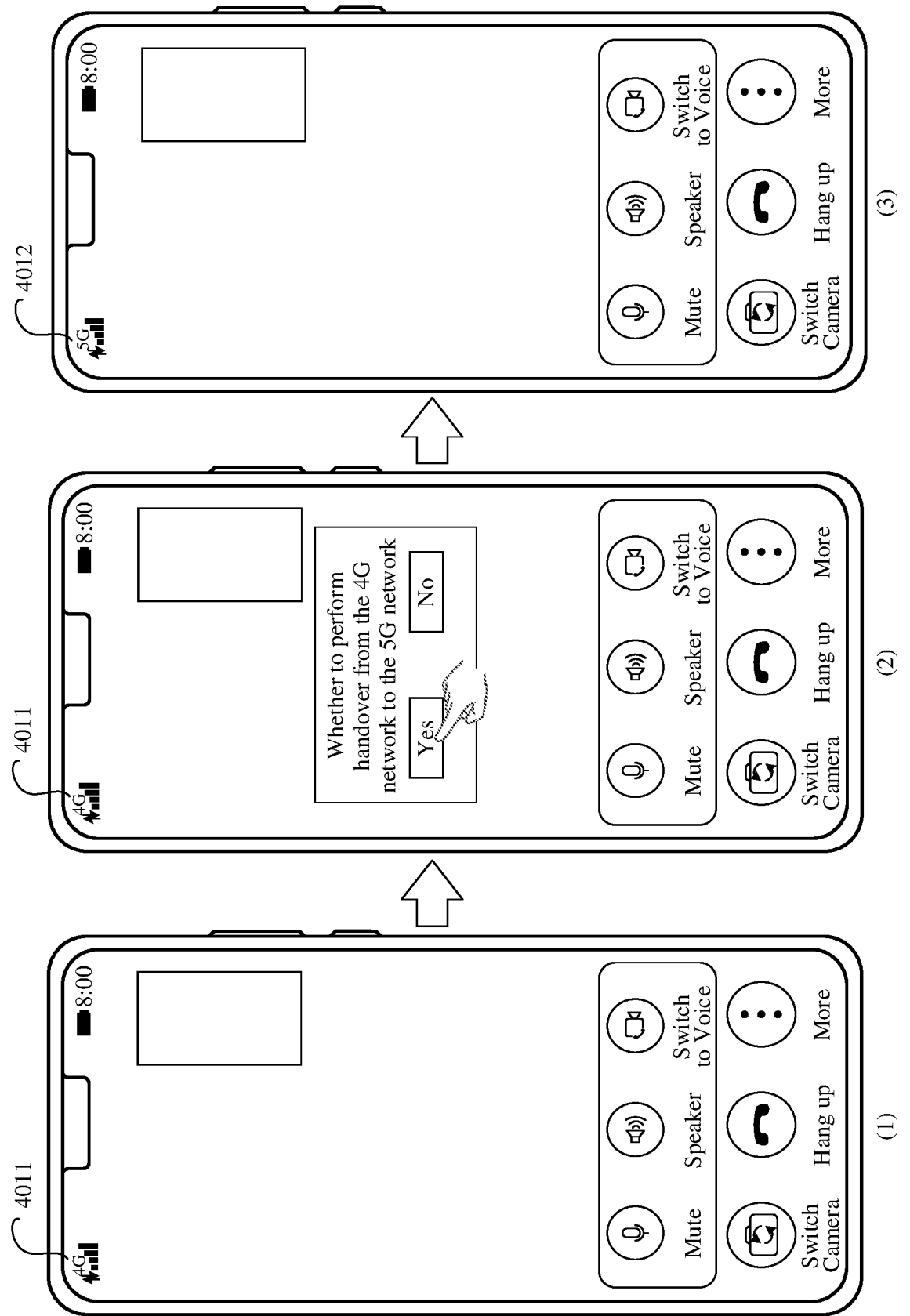
FIG. 4A is a schematic diagram of a possible display interface of a terminal device according to an embodiment of this application.

In an example, a terminal device is currently running an application 1, and a display interface of the terminal device is shown in (1) in FIG. 4A. When determining that a network does not meet a transmission requirement of service data of the application 1, the terminal device performs the procedure shown in FIG. 4. After receiving a recovery policy, the terminal device may display a prompt item. The prompt item is used to prompt a user whether to execute the recovery policy. For example, the recovery policy is handover from a 4G network to a 5G network. (2) in FIG. 4A shows a display interface of the terminal device that includes a prompt item. In response to the user selecting "Yes", the terminal device displays a display interface shown in (3) in FIG. 4A. An icon on the terminal device used to represent a radio access type is changed from 4011 in (2) in FIG. 4A to 4012 in (2) in FIG. 4A.

Figure 4B:
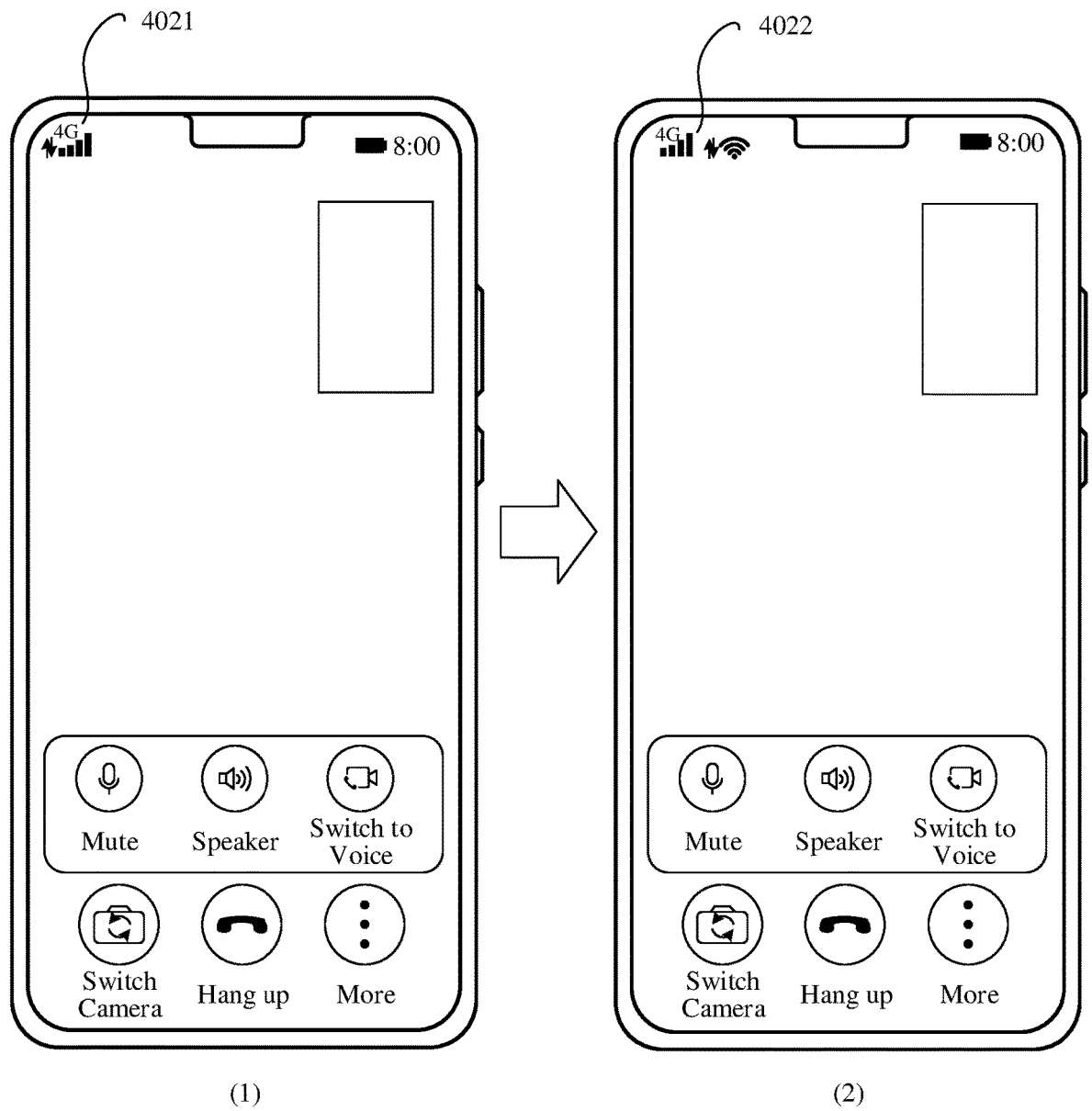
FIG. 4B is a schematic diagram of a possible display interface of a terminal device according to an embodiment of this application.

In another example, the terminal device is currently running the application 1, the display interface of the terminal device is shown in (1) in FIG. 4B. A radio access type currently used by the terminal device is a 4G network, and an icon that is displayed on the terminal device and used to represent the radio access type is shown in 4021 in (1) in FIG. 4B. After determining that the network does not meet the transmission requirement of the service data of the application 1, the terminal device performs the procedure shown in FIG. 4. For example, the recovery policy is handover from the 4G network to a Wi-Fi network. After the handover from the 4G network to the Wi-Fi network is completed, the display interface of the terminal device is shown in (2) in FIG. 4B. After the handover, the radio access type currently used by the terminal device is the Wi-Fi network, and the icon that is displayed on the terminal device and used to represent the radio access type is shown in 4022 in (2) in FIG. 4B.

Refer to FIG. 5. An example in which it is determined, based on different scenarios, that a device for executing a recovery policy is a terminal device or a first access network device is used.

For S501 to S506, refer to S401 to S406. Details are not described herein again.

S507: The PCF generates the recovery policy based on the network status information and/or the network capability information.

Further, the PCF sends the recovery policy to the terminal device or the first access network device.

For a manner in which the PCF generates the recovery policy based on the network status information and/or the network capability information, refer to the description in the embodiment corresponding to FIG. 4. Details are not described herein again.

In a possible implementation, the determined recovery policy is access network device handover, cell handover, or communication network handover. The access network device handover, cell handover, or communication network handover may be triggered by the first access network device for execution. In this case, the PCF may send the recovery policy to the first access network device.

In an example, when sending the recovery policy to the first access network device, the PCF may send the recovery policy to the first access network device by using the SMF, and S508, S509A, and S510A are performed.

For S508, refer to S408. Details are not described herein again.

S509A: The SMF sends the recovery policy to the first access network device.

S510A: The first access network device executes the recovery policy.

In another possible implementation, the determined recovery policy is PDU session re-establishment or application layer processing, and the PDU session re-establishment or the application layer processing is triggered by the terminal device for execution. In this case, the PCF may send the recovery policy to the terminal device.

In an example, when sending the recovery policy to the terminal device, the PCF may send the recovery policy to the terminal device by using the SMF, and S508, S509B, and S510B are performed.

S509B: The SMF sends a PDU session modify command to the terminal device. The PDU session modify command includes the recovery policy, and may further include a reason why the network does not meet the transmission requirement of the service data.

S510B: The terminal device executes the recovery policy.

Figure 6:
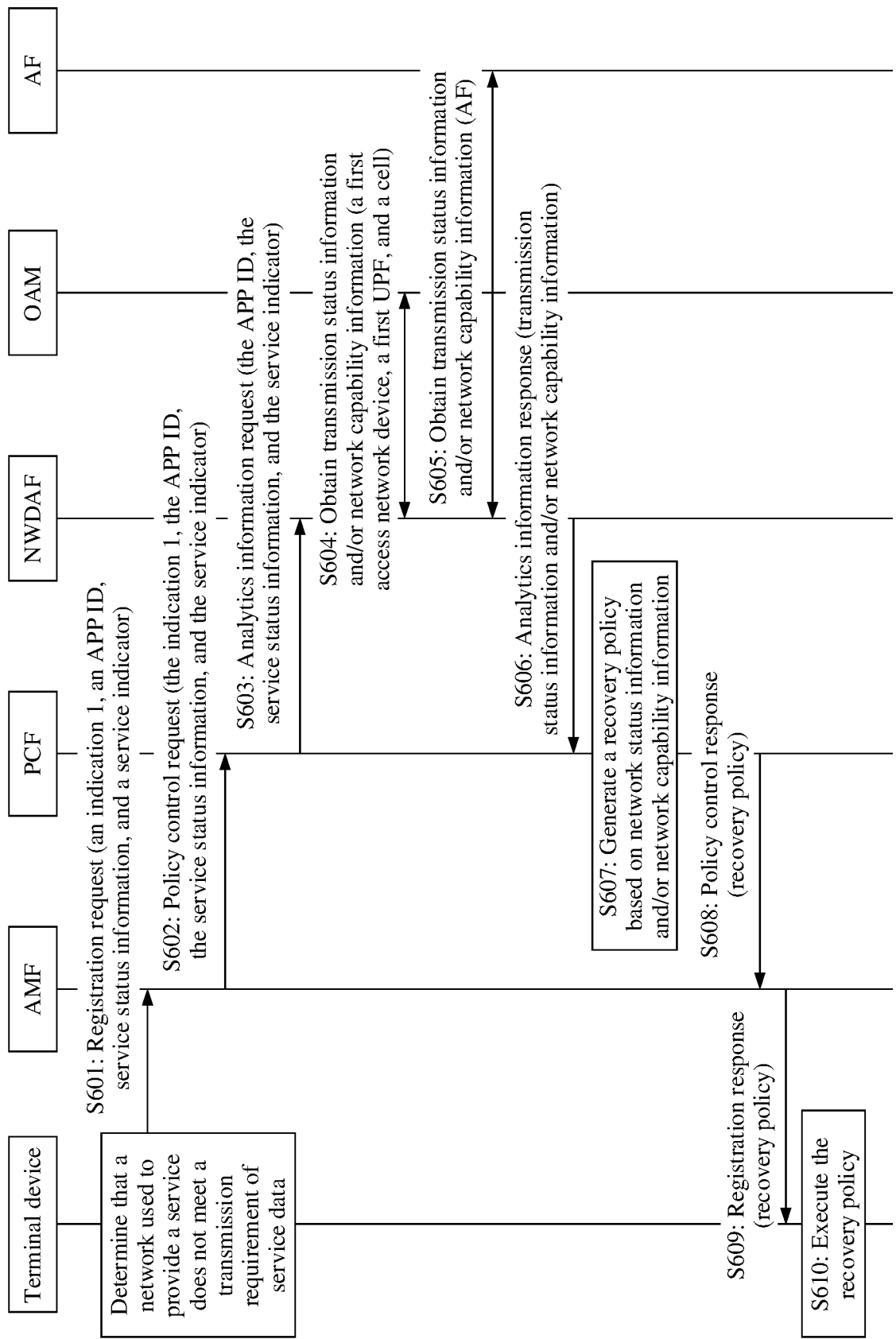
FIG. 6 is a schematic flowchart of a fourth possible communication method according to an embodiment of this application.
Figure 7:
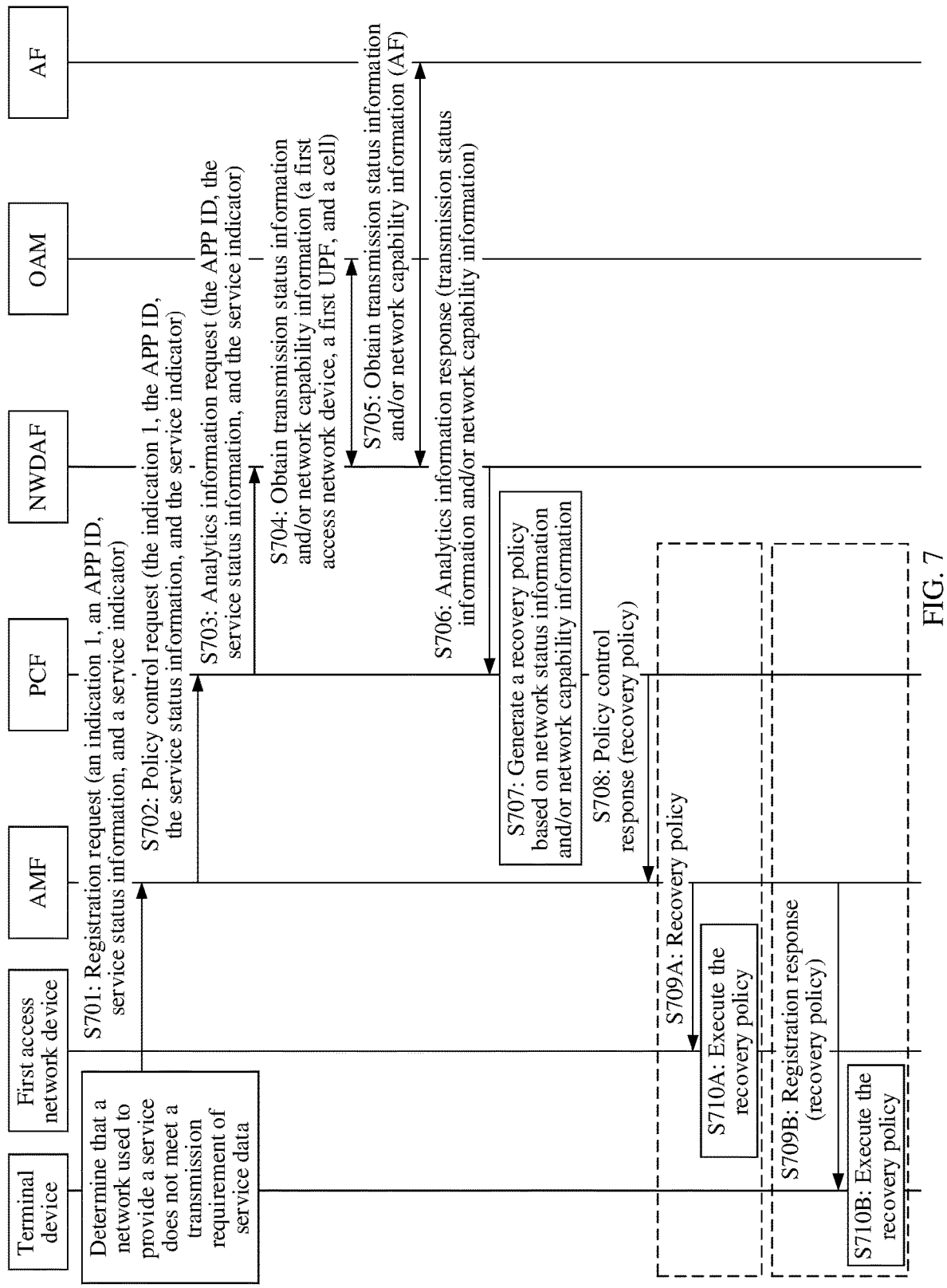
FIG. 7 is a schematic flowchart of a fifth possible communication method according to an embodiment of this application.

The following describes the second possible implementation in detail with reference to FIG. 6 and FIG. 7. For example, a PCF generates a recovery policy, and a terminal device requests the recovery policy from the PCF by using an AMF. In FIG. 6, an example in which a device for executing the recovery policy is a terminal device is used. In FIG. 6, an example in which devices for executing the recovery policy include the terminal device and a first access network device is used.

S601: The terminal device sends a first request to the AMF when determining that a network does not meet a transmission requirement of service data.

For example, the terminal device may send the first request to the AMF by using a registration request message. In FIG. 6, an example in which the terminal device sends a registration request to the AMF is used. The registration request includes a PDU session ID. The PDU session ID is used to indicate a PDU session used by an application identified by an APP ID.

The registration request may further include an indication 1, and the indication 1 is used to indicate that the network does not meet the transmission requirement of the service data. The registration request may further include one or more of an APP ID, service status information, and a service indicator. For related descriptions of the APP ID, the service status information, and the service indicator, refer to the descriptions of the embodiment corresponding to FIG. 4. Details are not described herein again.

S602: The AMF sends the first request to the PCF.

For example, the AMF may send the first request to the PCF by using a policy control request message. In FIG. 6, an example in which the AMF sends a policy control request to the PCF is used.

In addition to content carried in the first request, the policy control request message may further include parameters such as an identifier of an access network device and an identifier of a UPF. For example, if the access network device is a gNB, the identifier of the access network device may be a gNB ID. The identifier of the UPF may be a UPF instance (instance ID). The identifier of the access network device is used to identify an access network device on which the terminal device currently camps. In subsequent description, for example, the access network device on which the terminal device currently camps is referred to as the first access network device. The identifier of the UPF is used to identify a UPF that currently provides a service for the terminal device. In subsequent descriptions, for example, the UPF that currently provides a service for the terminal device is referred to as a first UPF.

For S603 to S606, refer to S403 to S406. Details are not described herein again.

S607: The PCF generates the recovery policy based on the network status information and/or the network capability information.

Further, the PCF sends the recovery policy to the terminal device by using the AMF. For example, the recovery policy is sent to the terminal device by using S608 and S609.

For a manner in which the PCF generates the recovery policy based on the network status information and/or the network capability information, refer to related descriptions in S407. Details are not described herein again.

S608: The PCF sends a policy control response message to the AMF. The policy control response message includes the recovery policy. The policy control response message may further include a reason why the network does not meet the transmission requirement of the service data.

S609: The AMF sends a registration response to the terminal device. The registration response includes the recovery policy. The registration response may further include the reason why the network does not meet the transmission requirement of the service data.

S610: The terminal device executes the recovery policy.

Refer to FIG. 7. An example in which it is determined, based on different scenarios, that a device for executing a recovery policy is a terminal device or a first access network device is used.

For S701 to S706, refer to S601 to S606. Details are not described herein again.

S707: The PCF generates the recovery policy based on the network status information and/or the network capability information.

Further, the PCF sends the recovery policy to the terminal device or the first access network device.

For a manner in which the PCF generates the recovery policy based on the network status information and/or the network capability information, refer to the description in the embodiment corresponding to FIG. 4. Details are not described herein again.

In a possible implementation, the determined recovery policy is access network device handover, cell handover, or communication network handover. The access network device handover, cell handover, or communication network handover may be triggered by the first access network device for execution. In this case, the PCF may send the recovery policy to the first access network device.

In an example, when sending the recovery policy to the first access network device, the PCF may send the recovery policy to the first access network device by using the AMF, and S708, S709A, and S710A are performed.

S708: The PCF sends a policy control response message to the AMF. The policy control response message includes the recovery policy, and the policy control response message may further include a reason why the network does not meet the requirement of the service data.

S709A: The AMF sends the recovery policy to the first access network device. For example, the AMF may add the recovery policy to a control policy notification message and send the control policy notification message to the first access network device. The control policy notification message may further carry the reason why the network does not meet the transmission requirement of the service data.

S710A: The first access network device executes the recovery policy.

In another possible implementation, the determined recovery policy is PDU session re-establishment or application layer processing, and the PDU session re-establishment or the application layer processing is triggered by the terminal device for execution. In this case, the PCF may send the recovery policy to the terminal device by using the AMF, for example, perform S708, S709B, and S710B.

S709B: The AMF sends a registration response to the terminal device. The registration response includes the recovery policy, and may further include a reason why the network does not meet the transmission requirement of the service data.

S710B: The terminal device executes the recovery policy.

Figure 8:
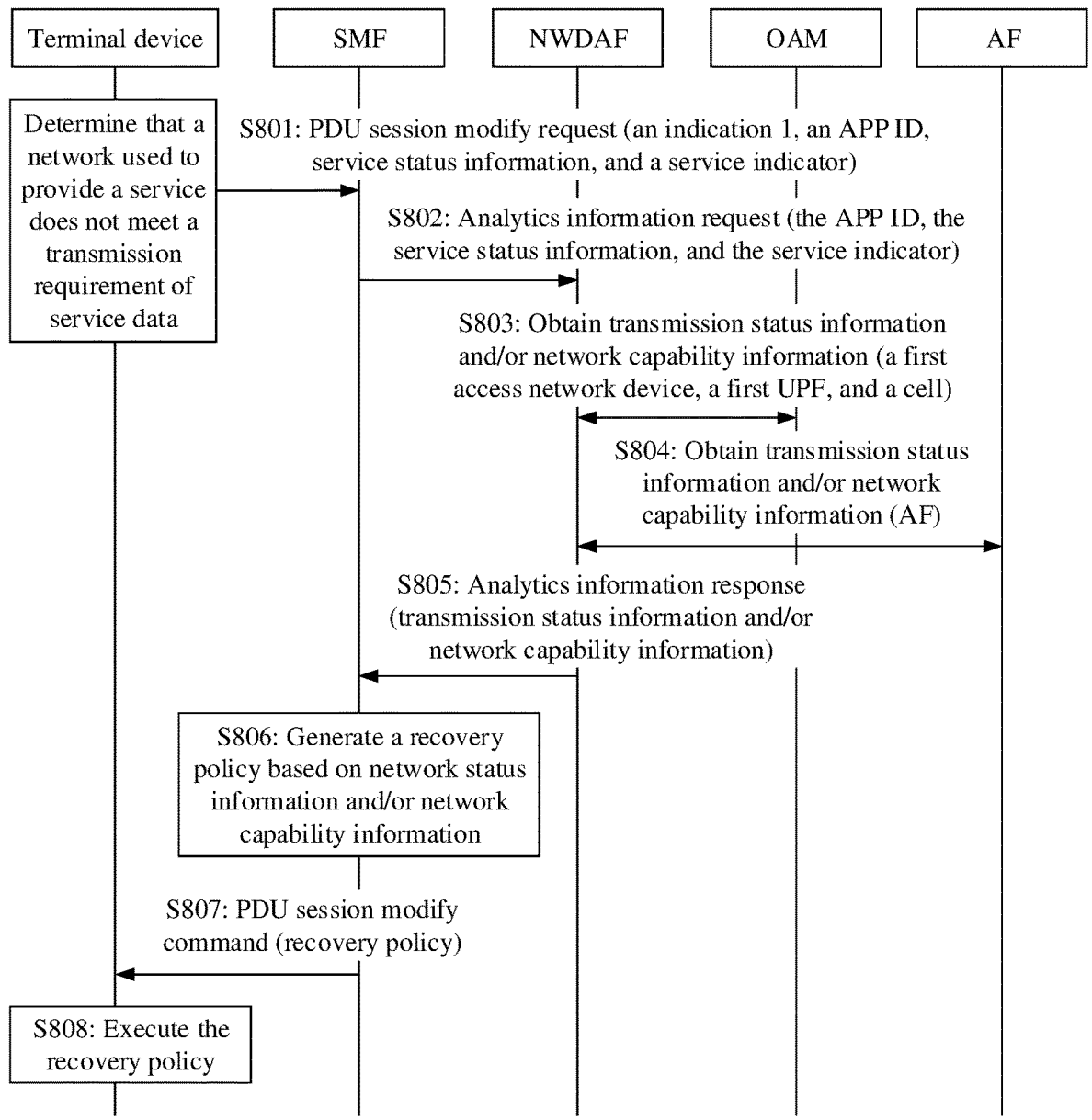
FIG. 8 is a schematic flowchart of a sixth possible communication method according to an embodiment of this application.
Figure 9:
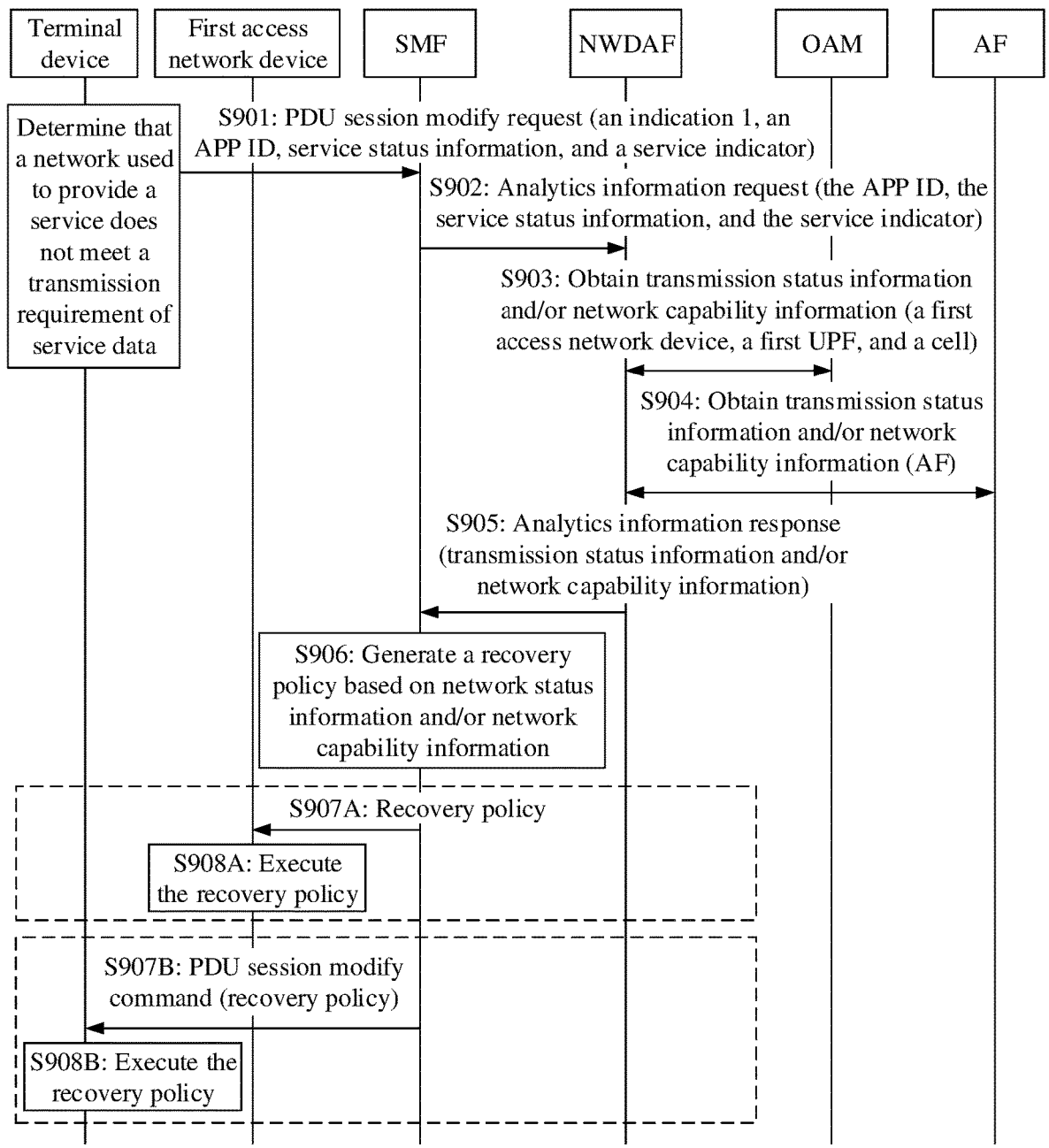
FIG. 9 is a schematic flowchart of a seventh possible communication method according to an embodiment of this application.

The following describes the third possible implementation in detail with reference to FIG. 8 and FIG. 9. For example, an SMF generates a recovery policy, and a terminal device requests the recovery policy from the SMF. In FIG. 8, an example in which a device for executing the recovery policy is the terminal device is used. In FIG. 9, an example in which devices for executing the recovery policy include the terminal device and a first access network device is used.

S801: The terminal device sends a first request to the SMF by using a PDU session modify request message when determining that a network does not meet a transmission requirement of service data.

In an example, the terminal device may send the PDU session modify request to the SMF by using an AMF. The PDU session modify request may carry a PDU session ID. The PDU session modify request message may further include an indication 1, and the indication 1 is used to indicate that the network does not meet the transmission requirement of the service data. The PDU session modify request message may further include one or more of an APP ID, service status information, and a service indicator. For related descriptions of the APP ID, the service status information, and the service indicator, refer to the descriptions of the embodiment corresponding to FIG. 4. Details are not described herein again.

S802: The SMF sends an analytics information request (Nnwdaf_Analyticsinfo Request) message to an NWDAF. The Nnwdaf_Analyticsinfo Request message is used to request network transmission information, and the network transmission information is used to represent a transmission status of the network that provides a service for the terminal device. The Nnwdaf_Analyticsinfo Request includes one or more of an APP ID, service status information, and a service indicator. The Nnwdaf_Analyticsinfo Request may further include the PDU session ID. The Nnwdaf_Analyticsinfo Request may further include parameters such as an identifier of an access network device and an identifier of a UPF. For example, if the access network device is a gNB, the identifier of the access network device may be a gNB ID.

For related descriptions of the network transmission information, refer to the description in the embodiment of FIG. 4. Details are not described herein again.

For S803 and S804, refer to S404 and S405. Details are not described herein again.

The NWDAF obtains, by using the foregoing steps S803 and S804, a transmission status of a network element in the network that provides a service for the terminal device, and obtains the network status information through aggregation. The NWDAF may further obtain, by using the foregoing steps S803 and S804, a service processing capability of the network element in the network that provides a service for the terminal device, and further obtain the network capability information through aggregation.

S805: The NWDAF sends the network status information and/or the network capability information to the SMF.

The NWDAF may send the network status information and/or the network capability information to the SMF by using an Nnwdaf_Analyticsinfo Response.

S806: The SMF generates the recovery policy based on the network status information and/or the network capability information.

A manner in which the SMF generates the recovery policy based on the network status information and/or the network capability information is similar to the manner in which the PCF generates the recovery policy in FIG. 4. For details, refer to the manner in which the PCF generates the recovery policy described in FIG. 4. Details are not described herein again.

S807: The SMF sends the recovery policy to the terminal device. For example, the SMF sends a PDU session modify command to the terminal device. The PDU session modify command includes the recovery policy. The PDU session modify command may further include a reason why the network does not meet the transmission requirement of the service data.

S808: The terminal device executes the recovery policy.

Refer to FIG. 9. An example in which it is determined, based on different scenarios, that a device for executing a recovery policy is a terminal device or a first access network device is used.

For S901 to S906, refer to S801 to S806. Details are not described herein again.

After the SMF generates the recovery policy based on the network status information and/or the network capability information, the SMF sends the recovery policy to the terminal device or the first access network device.

In a possible implementation, the determined recovery policy is access network device handover, cell handover, or communication network handover. The access network device handover, cell handover, or communication network handover may be triggered by the first access network device for execution. In this case, the SMF performs S907A, and the SMF may send the recovery policy to the first access network device. Further, the first access network device performs S908A to execute the recovery policy.

In another possible implementation, the determined recovery policy is PDU session re-establishment or application layer processing, and the PDU session re-establishment or the application layer processing is triggered by the terminal device for execution. In this case, the SMF performs S907B to send the recovery policy to the terminal device. Further, the terminal device performs S908B to execute the recovery policy.

Figure 10:
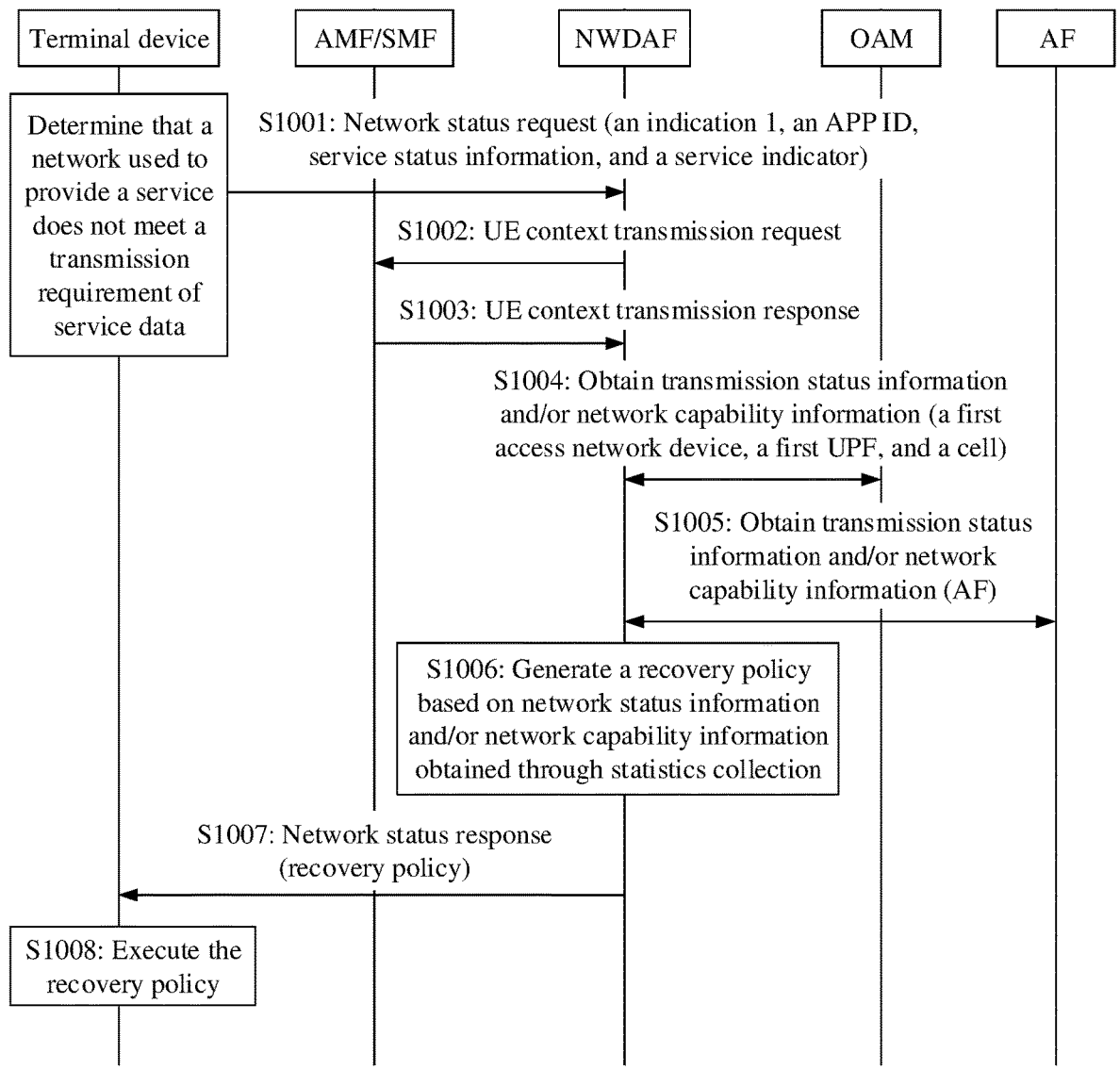
FIG. 10 is a schematic flowchart of an eighth possible communication method according to an embodiment of this application.

The following describes the fourth possible implementation in detail with reference to FIG. 10. For example, an NWDAF generates a recovery policy, and a terminal device directly requests the recovery policy from the NWDAF.

S1001: The terminal device sends a first request to the NWDAF, where the first request is used to request the recovery policy, or may be described as that the first request is used to request to analyze a network status. The first request includes one or more of a PDU session ID, an indication 1, an APP ID, service status information, and a service indicator.

Figure 11:
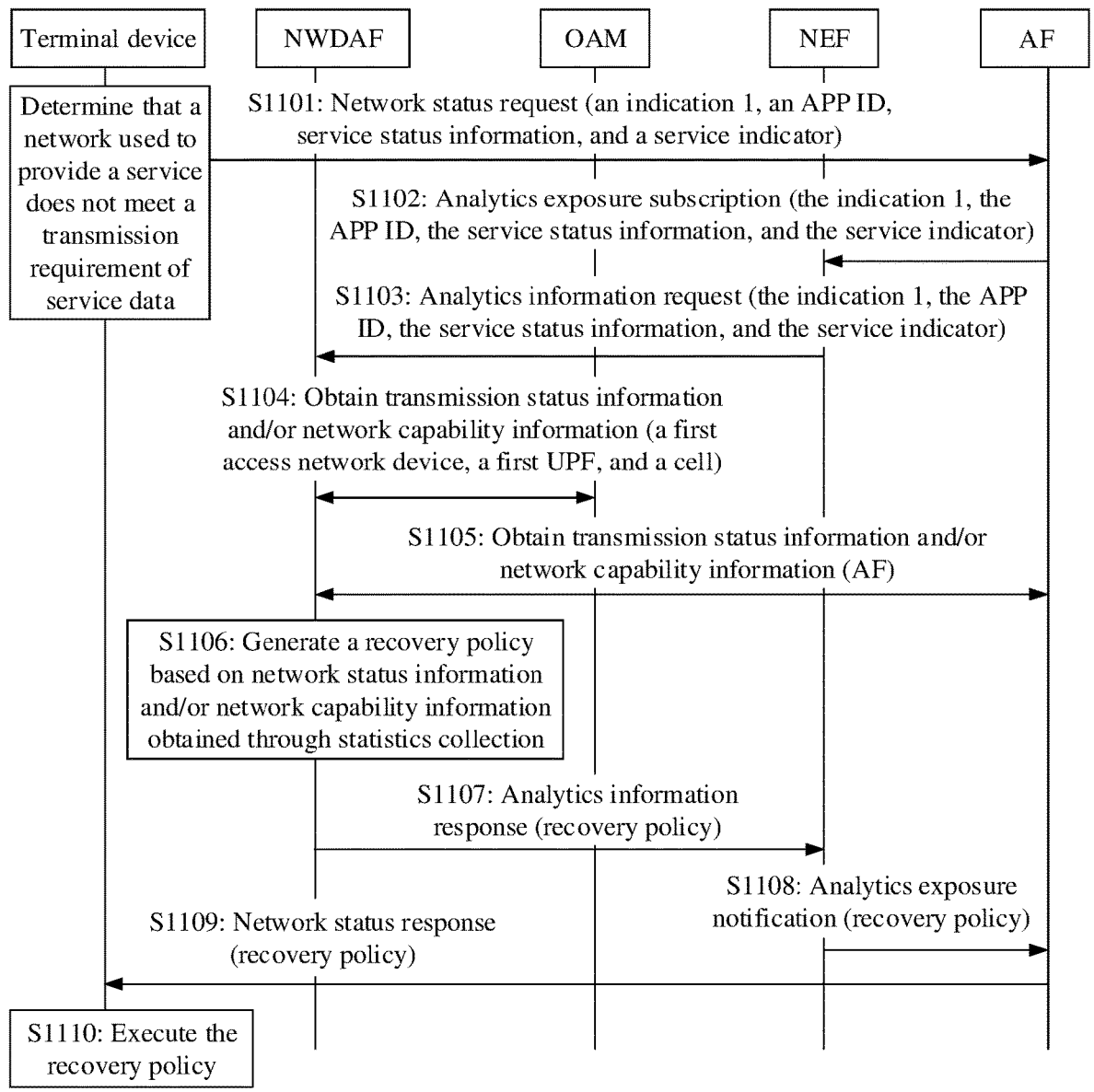
FIG. 11 is a schematic flowchart of a ninth possible communication method according to an embodiment of this application.

For example, the first request may be a network status request message. In FIG. 11, an example in which the first request is a network status request message is used.

S1002: The NWDAF sends a UE context transmission request message to an AMF/SMF, where the UE context transmission request message is, for example, Namf_conmunition_UEContextTransfer. The NWDAF requests, from the AMF/SMF by using the UE context transmission request message, an identifier of a first access network device that currently provides an access service for the terminal device and an identifier of a first UPF that provides a user plane service for the terminal device.

S1003: The AMF/SMF sends a UE context transmission response to the NWDAF, where the UE context transmission response is, for example, a Namf_conmunition_UEContextTransfer Response. The AMF/SMF feeds back, to the NWDAF by using the UE context transmission response, the identifier of the first access network device that currently provides the access service for the terminal device and the identifier of the first UPF that provides the user plane service for the terminal device.

For S1004 and S1005, refer to S404 and S405. Details are not described herein again.

S1006: The NWDAF generates the recovery policy based on network status information and/or network capability information obtained through statistics collection.

A manner in which the NWDAF generates the recovery policy based on the network status information and/or the network capability information is similar to the manner in which the PCF generates the recovery policy in FIG. 4. For details, refer to the manner in which the PCF generates the recovery policy described in FIG. 4. Details are not described herein again.

S1007: The NWDAF sends a network status response message to the terminal device, where the network status response message includes the recovery policy. The network status response message may further include a reason why the network does not meet the transmission requirement of the service data.

S1008: The terminal device executes the recovery policy.

In a possible implementation, the determined recovery policy is access network device handover, cell handover, or communication network handover. The access network device handover, cell handover, or communication network handover may be triggered by the first access network device or the terminal device for execution. In FIG. 10, an example in which execution is triggered by the terminal device is used. When execution is triggered by the first access network device, S1007 may be replaced with that the NWDAF sends the recovery policy to the first access network device, and S1008 may be replaced with that the first access network device executes the recovery policy.

In another possible implementation, the determined recovery policy is PDU session re-establishment or application layer processing, and the PDU session re-establishment or the application layer processing is triggered by the terminal device for execution. In this case, the NWDAF performs S1007.

The following describes the fifth possible implementation in detail with reference to FIG. 11. For example, an NWDAF generates a recovery policy, and a terminal device requests the recovery policy from the NWDAF by using an AF.

S1101: The terminal device sends a network status request message to the AF, where the network status request message includes one or more of a PDU session ID, an indication 1, an APP ID, service status information, and a service indicator.

The AF requests, by using an NEF, the NWDAF to analyze a network status, for example, performs S1102 and S1103.

S1102: The AF sends analytics exposure subscription to the NEF, where the analytics exposure subscription includes but is not limited to Nnef_AnalyticsExposure_Subscribe.

S1103: The NEF sends an analytics information request to the NWDAF, where the analytics information request includes but is not limited to an Nnwdaf_Analyticsinfo Request.

For S1104 and S1105, refer to S404 and S405. Details are not described herein again.

For S1106, refer to S1006. Details are not described herein again.

S1107: The NWDAF sends an analytics information response to the NEF, where the analytics information response includes but is not limited to an Nnwdaf_Analyticsinfo Response. The analytics information response includes the recovery policy, and may further include a reason why the network does not meet the transmission requirement of the service data.

S1108: The NEF sends analytics exposure notification to the AF, where the analytics exposure notification includes but is not limited to Nnef_AnalyticsExposure_Notify. The analytics exposure notification includes the recovery policy.

S1109: The AF sends a network status response to the terminal device, where the network status response includes the recovery policy.

S1110: The terminal device executes the recovery policy.

In a possible implementation, the determined recovery policy is access network device handover, cell handover, or communication network handover. The access network device handover, cell handover, or communication network handover may be triggered by the first access network device or the terminal device for execution. In FIG. 11, an example in which execution is triggered by the terminal device is used. When execution is triggered by the first access network device, S1109 may be replaced with that the AF sends the recovery policy to the first access network device, and S1110 may be replaced with that the first access network device executes the recovery policy.

In another possible implementation, the determined recovery policy is PDU session re-establishment or application layer processing, and the PDU session re-establishment or the application layer processing is triggered by the terminal device for execution. In this case, the NWDAF performs S1109.

Figure 12:
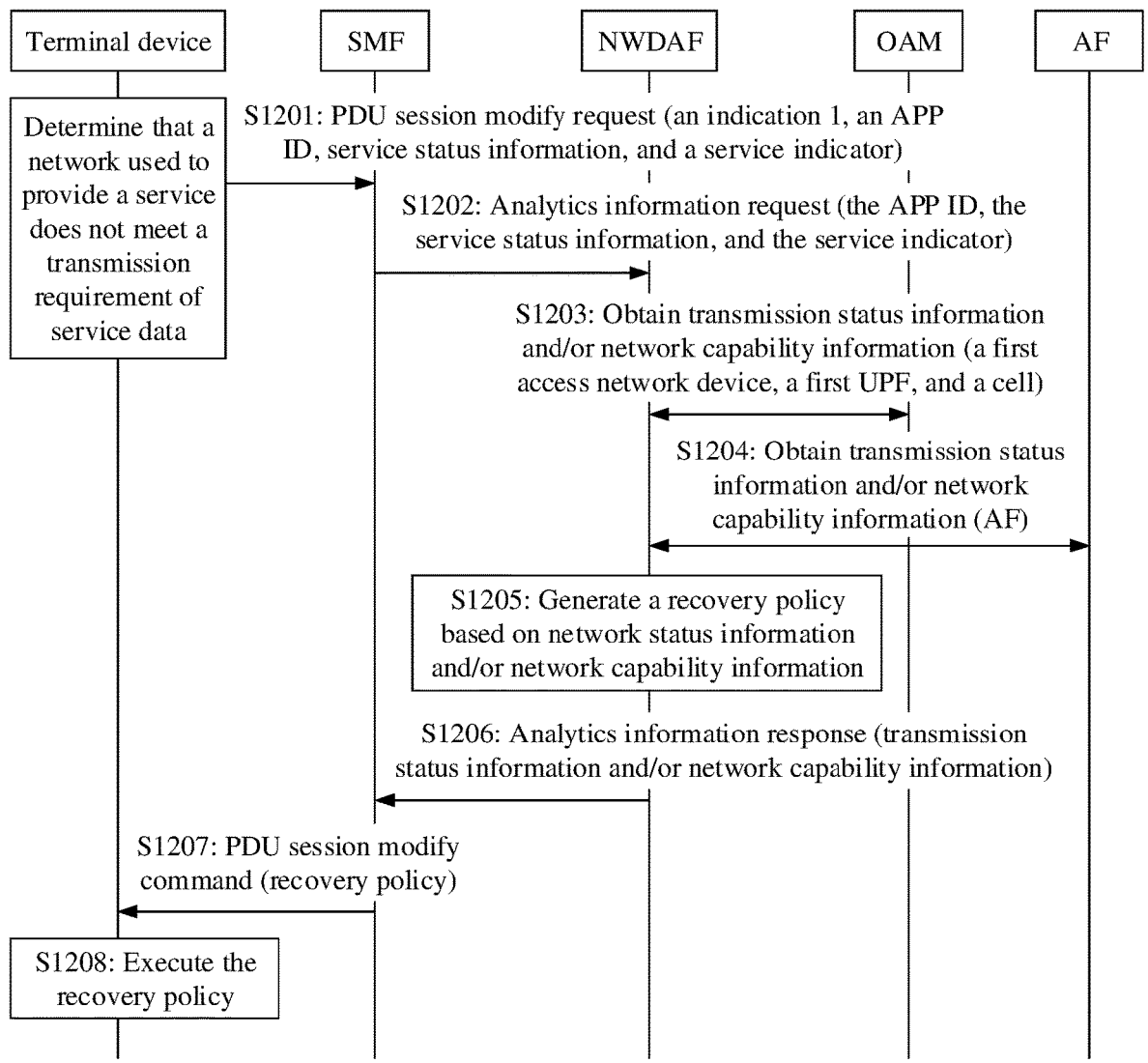
FIG. 12 is a schematic flowchart of a tenth possible communication method according to an embodiment of this application.

The following describes the sixth possible implementation in detail with reference to FIG. 12. For example, an NWDAF generates a recovery policy, and a terminal device requests the recovery policy from the NWDAF by using an SMF.

S1201: The terminal device sends a first request to the SMF by using a PDU session modify request message when determining that a network does not meet a transmission requirement of service data. For details, refer to S801. Details are not described herein again.

For S1202 to S1204, refer to S802 to S805. Details are not described herein again.

For S1205, refer to S1006. Details are not described herein again.

S1206: The NWDAF sends the recovery policy to the SMF by using an Nnwdaf_Analyticsinfo Response.

S1207: The SMF sends the recovery policy to the terminal device. For example, the SMF sends a PDU session modify command to the terminal device. The PDU session modify command includes the recovery policy. The PDU session modify command may further include a reason why the network does not meet the transmission requirement of the service data.

S1208: The terminal device executes the recovery policy.

In a possible implementation, the determined recovery policy is access network device handover, cell handover, or communication network handover. The access network device handover, cell handover, or communication network handover may be triggered by the first access network device or the terminal device for execution. In FIG. 12, an example in which execution is triggered by the terminal device is used. When execution is triggered by the first access network device, S1207 may be replaced with that the SMF sends the recovery policy to the first access network device, and S1208 may be replaced with that the first access network device executes the recovery policy.

In another possible implementation, the determined recovery policy is PDU session re-establishment or application layer processing, and the PDU session re-establishment or the application layer processing is triggered by the terminal device for execution. In this case, the SMF performs S1207.

Figure 13:
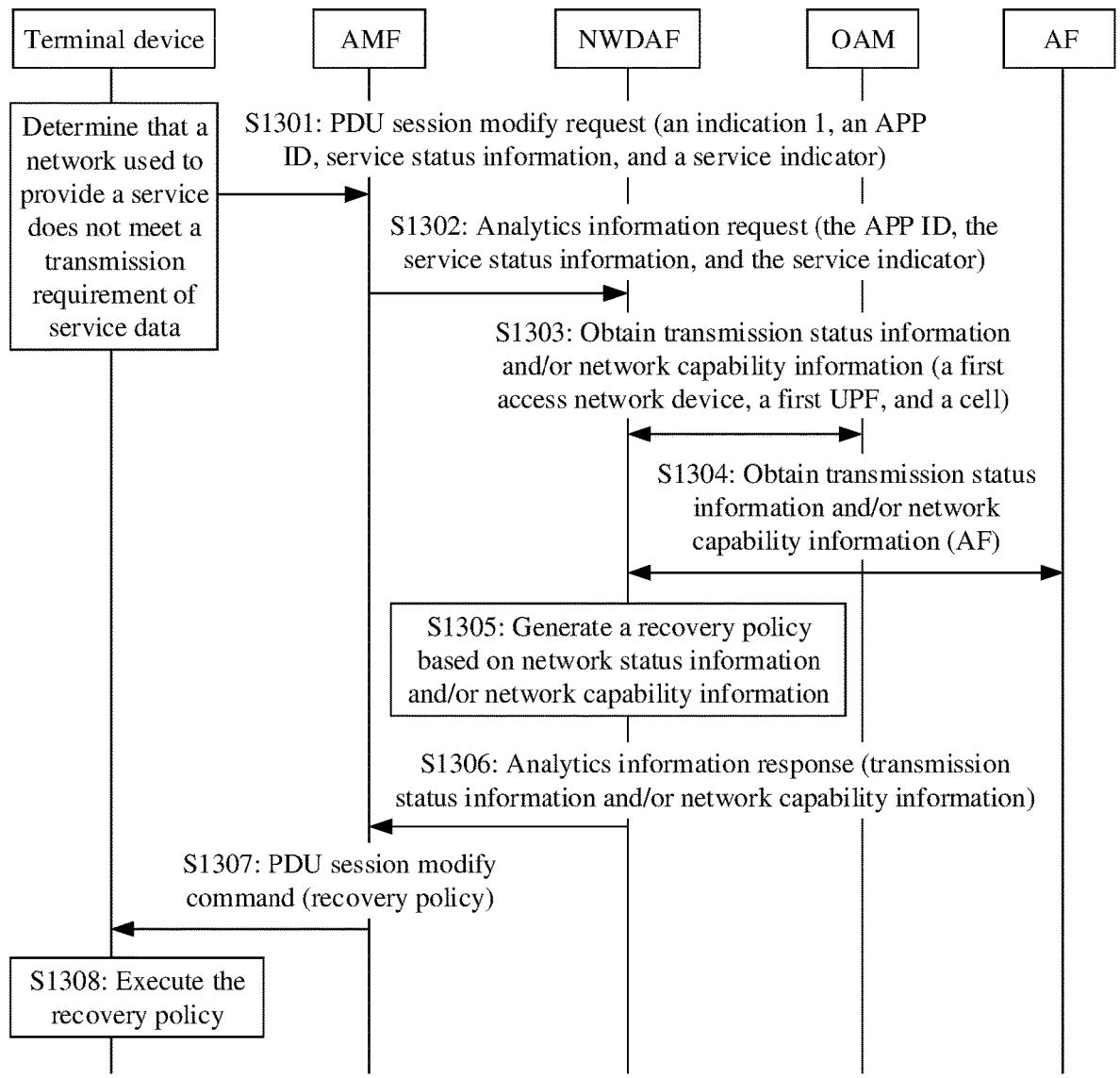
FIG. 13 is a schematic flowchart of an eleventh possible communication method according to an embodiment of this application.

The following describes the seventh possible implementation in detail with reference to FIG. 13. For example, an NWDAF generates a recovery policy, and a terminal device requests the recovery policy from the NWDAF by using an AMF.

S1301: The terminal device sends a first request to the AMF by using a registration request message when determining that a network does not meet a transmission requirement of service data. For details, refer to S601. Details are not described herein again.

S1302: The AMF sends an analytics information request message to the NWDAF, where the analytics information request includes but is not limited to an Nnwdaf_Analyticsinfo Request. The analytics information request message includes one or more of a PDU session ID, an APP ID, service status information, and a service indicator.

For S1302 to S1304, refer to S802 to S805. Details are not described herein again.

For S1305, refer to S1006. Details are not described herein again.

S1306: The NWDAF sends the recovery policy to the AMF by using an Nnwdaf_Analyticsinfo Response.

S1307: The AMF sends the recovery policy to the terminal device. For example, the AMF sends a registration response to the terminal device. The registration response includes the recovery policy. The registration response may further include a reason why the network does not meet the transmission requirement of the service data.

S1308: The terminal device executes the recovery policy.

In a possible implementation, the determined recovery policy is access network device handover, cell handover, or communication network handover. The access network device handover, cell handover, or communication network handover may be triggered by the first access network device or the terminal device for execution. In FIG. 13, an example in which execution is triggered by the terminal device is used. When execution is triggered by the first access network device, S1307 may be replaced with that the AMF sends the recovery policy to the first access network device, and S1308 may be replaced with that the first access network device executes the recovery policy.

In another possible implementation, the determined recovery policy is PDU session re-establishment or application layer processing, and the PDU session re-establishment or the application layer processing is triggered by the terminal device for execution. In this case, the AMF performs S1307.

Figure 14:
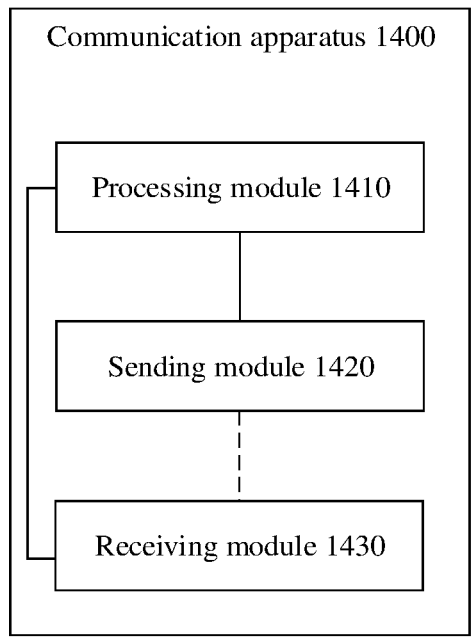
FIG. 14 is a schematic diagram of a structure of a communication apparatus 1400 according to an embodiment of this application.

FIG. 14 is a schematic block diagram of a communication apparatus 1400 according to an embodiment of this application. The communication apparatus 1400 includes a processing module 1410, a receiving module 1430, and a sending module 1420. In an example, the sending module 1420 may be a transmitter, and the receiving module 1430 may be a receiver. The transmitter may include an antenna, a radio frequency circuit, and the like. The receiver may also include an antenna, a radio frequency circuit, and the like. The transmitter and the receiver may belong to a same function module, for example, referred to as a transceiver. Alternatively, the transmitter and the receiver may be function modules independent of each other. The processing module 1410 may be a processor, for example, a baseband processor. The baseband processor may include one or more central processing units (CPUs). In another example, the sending module 1420 and the receiving module 1430 may be radio frequency units, and the processing module 1410 may be a processor, for example, a baseband processor. In still another example, the sending module 1420 and the receiving module 1430 may be input/output interfaces of a chip (for example, a baseband chip) (for example, if the sending module 1420 is an output interface, the receiving module 1430 is an input interface, or if the input interface and the output interface are a same interface, both the sending module 1420 and the receiving module 1430 are the interface). The processing module 1410 may be a processor of a chip system, and may include one or more central processing units. It should be understood that the processing module 1410 in this embodiment of this application may be implemented by the processor or a processor-related circuit component, the sending module 1420 may be implemented by the transmitter or a transmitter-related circuit component, and the receiving module 1430 may be implemented by the receiver or a receiver-related circuit component.

The sending module 1420 and the receiving module 1430 may be one function module, and the function module may be referred to as a transceiver module. The transceiver module can complete both a sending operation and a receiving operation. Alternatively, the sending module 1420 and the receiving module 1430 may be two function modules, and the transceiver module may be considered as a generic term of the two function modules. The sending module 1420 is configured to complete a sending operation, and the receiving module 1430 is configured to complete a receiving operation.

In an application scenario, the communication apparatus 1400 is applied to an SMF. For example, the communication apparatus 1400 may be an SMF, or may be a chip applied to the SMF, or another component or assembly having the foregoing SMF function.

For example, the processing module 1410 may be configured to perform all operations, except receiving and sending operations, performed by the SMF in any one of embodiments shown in FIG. 4, FIG. 5, FIG. 8 to FIG. 10, and FIG. 12, for example, S806 in FIG. 8, or S906 in FIG. 9; and/or configured to support another process in the technology described in this specification. The sending module 1420 may be configured to perform a sending operation performed by the SMF in any one of embodiments shown in FIG. 4, FIG. 5, FIG. 8 to FIG. 10, and FIG. 12, for example, S402 and S409 in FIG. 4, S502, S509A, and S509B in FIG. 5, S702, S709A, and S709B in FIG. 8, S1003 in FIG. 10, or S1202 and S1207 in FIG. 12; and/or configured to support another process in the technology described in this specification. The receiving module 1430 may be configured to perform a receiving operation performed by the SMF in any one of embodiments shown in FIG. 4, FIG. 5, FIG. 8 to FIG. 10, and FIG. 12, for example, S401 and S408 in FIG. 4, S501 and S508 in FIG. 5, S801 and S805 in FIG. 8, S1002 in FIG. 10, or S1201 and S1206 in FIG. 12; and/or configured to support another process in the technology described in this specification. In addition, for implementations of the sending module 1420 and the receiving module 1430, refer to descriptions of the implementations of the sending module 1420 and the receiving module 1430.

In another application scenario, the communication apparatus 1400 is applied to an AMF. For example, the communication apparatus 1400 may be an AMF, or may be a chip applied to the AMF, or another component or assembly having the foregoing AMF function.

For example, the processing module 1410 may be configured to perform all operations, except receiving and sending operations, performed by the AMF in any one of embodiments shown in FIG. 6, FIG. 7, FIG. 10, and FIG. 13. The sending module 1420 may be configured to perform a sending operation performed by the AMF in any one of embodiments shown in FIG. 6, FIG. 7, FIG. 10, and FIG. 13, for example, S602 and S609 in FIG. 6, S702, S709A, and S709B in FIG. 7, S1003 in FIG. 10, or S1302 and S1307 in FIG. 13; and/or configured to support another process in the technology described in this specification. The receiving module 1430 may be configured to perform a receiving operation performed by the AMF in any one of embodiments shown in FIG. 6, FIG. 7, FIG. 10, and FIG. 13, for example, S601 and S608 in FIG. 6, S701 and S708 in FIG. 7, S1002 in FIG. 10, or S1301 and S1306 in FIG. 13; and/or configured to support another process in the technology described in this specification. In addition, for implementations of the sending module 1420 and the receiving module 1430, refer to descriptions of the implementations of the sending module 1420 and the receiving module 1430.

In another application scenario, the communication apparatus 1400 is applied to a PCF. For example, the communication apparatus 1400 may be a PCF, or may be a chip applied to the PCF, or another component or assembly having the foregoing PCF function.

For example, the processing module 1410 may be configured to perform all operations, except receiving and sending operations, performed by the PCF in any one of embodiments shown in FIG. 4 to FIG. 7, for example, S407 in FIG. 4, S507 in FIG. 5, S607 in FIG. 6, or S707 in FIG. 7. The sending module 1420 may be configured to perform a sending operation performed by the PCF in any one of embodiments shown in FIG. 4 to FIG. 7, for example, S403 and S408 in FIG. 4, S503 and S508 in FIG. 5, S603 and S608 in FIG. 6, or S703 and S708 in FIG. 7; and/or configured to support another process in the technology described in this specification. The receiving module 1430 may be configured to perform a receiving operation performed by the PCF in any one of embodiments shown in FIG. 4 to FIG. 7, for example, S402 and S406 in FIG. 4, S502 and S506 in FIG. 5, S602 and S606 in FIG. 6, or S702 and S706 in FIG. 7; and/or configured to support another process in the technology described in this specification. In addition, for implementations of the sending module 1420 and the receiving module 1430, refer to descriptions of the implementations of the sending module 1420 and the receiving module 1430.

In still another application scenario, the communication apparatus 1400 is applied to an NWDAF. For example, the communication apparatus 1400 may be an NWDAF, or may be a chip applied to the NWDAF, or another component or assembly having the foregoing NWDAF function.

For example, the processing module 1410 may be configured to perform all operations, except receiving and sending operations, performed by the NWDAF in any one of embodiments shown in FIG. 4 to FIG. 13, for example, S1006 in FIG. 10, S1106 in FIG. 11, S1205 in FIG. 12, or S1305 in FIG. 13. The sending module 1420 may be configured to perform a sending operation performed by the NWDAF in any one of embodiments shown in FIG. 4 to FIG. 13, for example, S404 to S406 in FIG. 4, S504 to S506 in FIG. 5, S604 to S606 in FIG. 6, S704 to S706 in FIGS. 7, S803 to S805 in FIGS. 8, S903 to S905 in FIG. 9, S1002, S1004, S1005, and S1007 in FIG. 10, S1102, S1105, and S1109 in FIG. 11, S1203, S1204, and S1206 in FIG. 12, or S1302 to S1304, and S1306 in FIG. 13; and/or configured to support another process in the technology described in this specification. The receiving module 1430 may be configured to perform a receiving operation performed by the NWDAF in any one of embodiments shown in FIG. 4 to FIG. 13, for example, S403 to S405 in FIG. 4, S503 to S505 in FIG. 5, S603 to S605 in FIG. 6, S703 to S705 in FIG. 7, S802 to S804 in FIG. 8, S902 to S904 in FIG. 9, S1001, and S1003 to S1005 in FIG. 10, S1103 to S1105 in FIG. 11, S1202 to S1204 in FIG. 12, or S1302 to S1304 in FIG. 13; and/or configured to support another process in the technology described in this specification. In addition, for implementations of the sending module 1420 and the receiving module 1430, refer to descriptions of the implementations of the sending module 1420 and the receiving module 1430.

In yet another application scenario, the communication apparatus 1400 is applied to an AF. For example, the communication apparatus 1400 may be an AF, or may be a chip applied to the AF, or another component or assembly having the foregoing AF function.

For example, the processing module 1410 may be configured to perform all operations, except receiving and sending operations, performed by the AF in any one of embodiments shown in FIG. 4 to FIG. 13. The sending module 1420 may be configured to perform a sending operation performed by the AF in any one of embodiments shown in FIG. 4 to FIG. 13, for example, S405 in FIG. 4, S505 in FIG. 5, S605 in FIG. 6, S705 in FIG. 7, S805 in FIG. 8, S904 in FIG. 9, S1005 in FIGS. 10, S1102, S1105, and S1109 in FIG. 11, S1204 and S1206 in FIG. 12, or S1304 in FIG. 13; and/or configured to support another process in the technology described in this specification. The receiving module 1430 may be configured to perform a receiving operation performed by the AF in any one of embodiments shown in FIG. 4 to FIG. 13, for example, S405 in FIG. 4, S505 in FIG. 5, S605 in FIG. 6, S705 in FIG. 7, S805 in FIG. 8, S904 in FIG. 9, S1005 in FIG. 10, S1101 and S1108 in FIG. 11, S1204 in FIG. 12, or S1304 in FIG. 13; and/or configured to support another process in the technology described in this specification. In addition, for implementations of the sending module 1420 and the receiving module 1430, refer to descriptions of the implementations of the sending module 1420 and the receiving module 1430.

In still yet another application scenario, the communication apparatus 1400 is applied to a terminal device. For example, the communication apparatus 1400 may be a terminal device, or may be a chip applied to the terminal device, or another component or assembly having the foregoing terminal device function.

For example, the processing module 1410 may be configured to perform all operations, except receiving and sending operations, performed by the terminal device in any one of embodiments shown in FIG. 4 to FIG. 13, for example, S410 in FIG. 4, S510B in FIG. 5, S601 in FIG. 6, S710B in FIG. 7, S808 in FIG. 8, S908B in FIG. 9, S1008 in FIG. 10, S1110 in FIG. 11, S1208 in FIG. 12, or S1308 in FIG. 13. The sending module 1420 may be configured to perform a sending operation performed by the terminal device in any one of embodiments shown in FIG. 4 to FIG. 13, for example, S401 in FIG. 4, S501 in FIG. 5, S601 in FIG. 6, S701 in FIG. 7, S801 in FIG. 8, S901 in FIG. 9, S1001 in FIG. 10, S1101 in FIG. 11, S1201 in FIG. 12, or S1301 in FIG. 13; and/or configured to support another process in the technology described in this specification. The receiving module 1430 may be configured to perform a receiving operation performed by the terminal device in any one of embodiments shown in FIG. 4 to FIG. 13, for example, S409 in FIG. 4, S509B in FIG. 5, S609 in FIG. 6, S709B in FIG. 7, S807 in FIG. 8, S907B in FIG. 9, S1007 in FIG. 10, S1109 in FIG. 11, S1207 in FIG. 12, or S1307 in FIG. 13; and/or configured to support another process in the technology described in this specification. In addition, for implementations of the sending module 1420 and the receiving module 1430, refer to descriptions of the implementations of the sending module 1420 and the receiving module 1430.

It should be understood that division of units in the foregoing apparatus is merely logical function division. During actual implementation, all or some of the units may be integrated into one physical entity, or may be physically separated. In addition, all the units in the apparatus may be implemented by using software invoked by a processing element, or may be implemented by using hardware; or some units may be implemented by using software invoked by a processing element, and some units may be implemented by using hardware. For example, each unit may be a separately disposed processing element, or may be integrated into a chip of the apparatus for implementation. In addition, each unit may be stored in a memory in a form of a program, and a processing element of the apparatus invokes and executes a function of the unit. In addition, all or some of the units may be integrated together, or may be implemented independently. The processing element herein may also be a processor, and may be an integrated circuit having a signal processing capability. In an implementation process, the steps in the foregoing methods or the foregoing units may be implemented by using an integrated logic circuit of hardware in the processor element, or may be implemented by using software invoked by a processing element.

In an example, the unit in any one of the foregoing apparatuses may be one or more integrated circuits configured to implement the foregoing method, for example, one or more application-specific integrated circuits (ASICs), or one or more microprocessors (DSP), or one or more field programmable gate arrays (FPGAs), or a combination of at least two of these integrated circuit forms. For another example, when the unit in the apparatus may be implemented in a form of a program invoked by a processing element, the processing element may be a general-purpose processor, for example, a CPU or another processor that can invoke the program. For another example, these units may be integrated together and implemented in a form of a system-on-a-chip (SOC).

The foregoing unit for receiving (for example, the receiving module) is a transceiver of the apparatus, and is configured to receive a signal from another apparatus. For example, when the apparatus is implemented by using a chip, the receiving unit is a transceiver of the chip configured to receive a signal from another chip or apparatus. The foregoing unit for sending (for example, the sending module) is a transceiver of the apparatus, and is configured to send a signal to another apparatus. For example, when the apparatus is implemented by using a chip, the sending unit is a transceiver of the chip configured to send a signal to another chip or apparatus.

Figure 15:
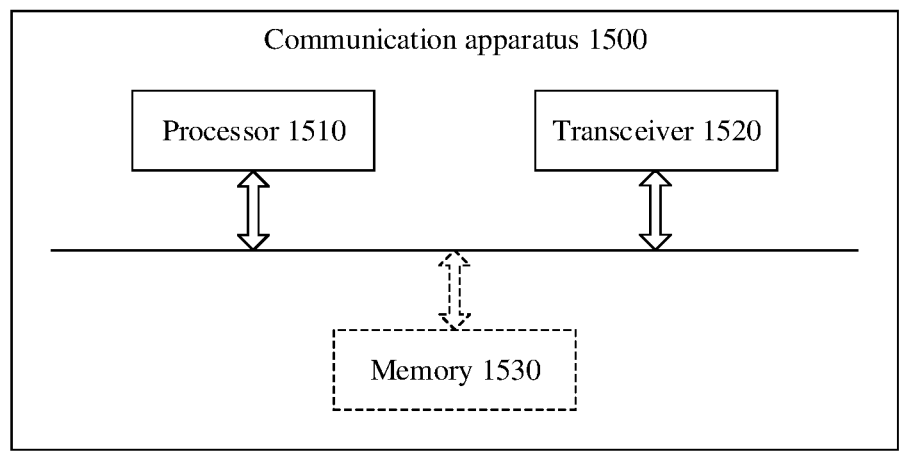
FIG. 15 is a schematic diagram of a structure of a communication apparatus 1500 according to an embodiment of this application.

As shown in FIG. 15, a communication apparatus 1500 includes a processor 1510 and a transceiver 1520. The processor 1510 and the transceiver 1520 are coupled to each other. It may be understood that the transceiver 1520 may be a transceiver or an input/output interface. Optionally, the communication apparatus 1500 may further include a memory 1530, configured to store instructions executed by the processor 1510, or store input data required by the processor 1510 to run the instructions, or store data generated after the processor 1510 runs the instructions.

When the communication apparatus 1500 is configured to implement the method in the foregoing method embodiment, the processor 1510 is configured to perform a function of the processing module 1410, and the transceiver 1520 is configured to perform functions of the sending module 1420 and the receiving module 1430.

Specifically, the processor 1510 may be a central processing unit (CPU), a network processor (NP), or a combination of a CPU and an NP. The processor 1510 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

For example, the apparatus 1500 may be the terminal device in the foregoing embodiments, or may be the PCF, the NWDAF, the AF, the AMF, or the SMF in the foregoing embodiments.

In an embodiment, when the apparatus implements the functions of the terminal device in any one of embodiments shown in FIG. 4 to FIG. 13, the transceiver 1520 may implement sending and receiving operations performed by the terminal device in any one of embodiments shown in FIG. 4 to FIG. 13, and the processor 1510 may implement other operations except the sending and receiving operations performed by the terminal device in any one of embodiments shown in FIG. 4 to FIG. 13. For detailed related descriptions, refer to related descriptions in the foregoing embodiments shown in FIG. 4 to FIG. 13. Details are not described herein again.

In another embodiment, when the apparatus implements the functions of the PCF in any one of embodiments shown in FIG. 4 to FIG. 7, the transceiver 1520 may implement sending and receiving operations performed by the PCF in any one of embodiments shown in FIG. 4 to FIG. 7, and the processor 1510 may implement other operations except the sending and receiving operations performed by the PCF in any one of embodiments shown in FIG. 4 to FIG. 7. For detailed related descriptions, refer to related descriptions in the foregoing embodiments shown in FIG. 4 to FIG. 7. Details are not described herein again.

In still another embodiment, when the apparatus implements the functions of the NWDAF in any one of embodiments shown in FIG. 4 to FIG. 13, the transceiver 1520 may implement sending and receiving operations performed by the NWDAF in any one of embodiments shown in FIG. 4 to FIG. 13, and the processor 1510 may implement other operations except the sending and receiving operations performed by the NWDAF in any one of embodiments shown in FIG. 4 to FIG. 13. For detailed related descriptions, refer to related descriptions in the foregoing embodiments shown in FIG. 4 to FIG. 13. Details are not described herein again.

In yet another embodiment, when the apparatus implements the functions of the AMF in any one of embodiments shown in FIG. 6, FIG. 7, FIG. 10, and FIG. 13, the transceiver 1520 may implement sending and receiving operations performed by the AMF in any one of embodiments shown in FIG. 6, FIG. 7, FIG. 10, and FIG. 13, and the processor 1510 may implement other operations except the sending and receiving operations performed by the AMF in any one of embodiments shown in FIG. 6, FIG. 7, FIG. 10, and FIG. 13. For detailed related descriptions, refer to related descriptions in the foregoing embodiments shown in FIG. 6, FIG. 7, FIG. 10, and FIG. 13. Details are not described herein again.

In still yet another embodiment, when the apparatus implements the functions of the SMF in any one of embodiments shown in FIG. 4, FIG. 5, FIG. 8 to FIG. 10, and FIG. 12, the transceiver 1520 may implement sending and receiving operations performed by the SMF in any one of embodiments shown in FIG. 4, FIG. 5, FIG. 8 to FIG. 10, and FIG. 12, and the processor 1510 may implement other operations except the sending and receiving operations performed by the SMF in any one of embodiments shown in FIG. 4, FIG. 5, FIG. 8 to FIG. 10, and FIG. 12. For detailed related descriptions, refer to related descriptions in the foregoing embodiments shown in FIG. 4, FIG. 5, FIG. 8 to FIG. 10, and FIG. 12. Details are not described herein again.

In a further embodiment, when the apparatus implements the functions of the AF in any one of embodiments shown in FIG. 4 to FIG. 13, the transceiver 1520 may implement sending and receiving operations performed by the AF in any one of embodiments shown in FIG. 4 to FIG. 13, and the processor 1510 may implement other operations except the sending and receiving operations performed by the AF in any one of embodiments shown in FIG. 4 to FIG. 13. For detailed related descriptions, refer to related descriptions in the foregoing embodiments shown in FIG. 4 to FIG. 13. Details are not described herein again.

Figure 16:
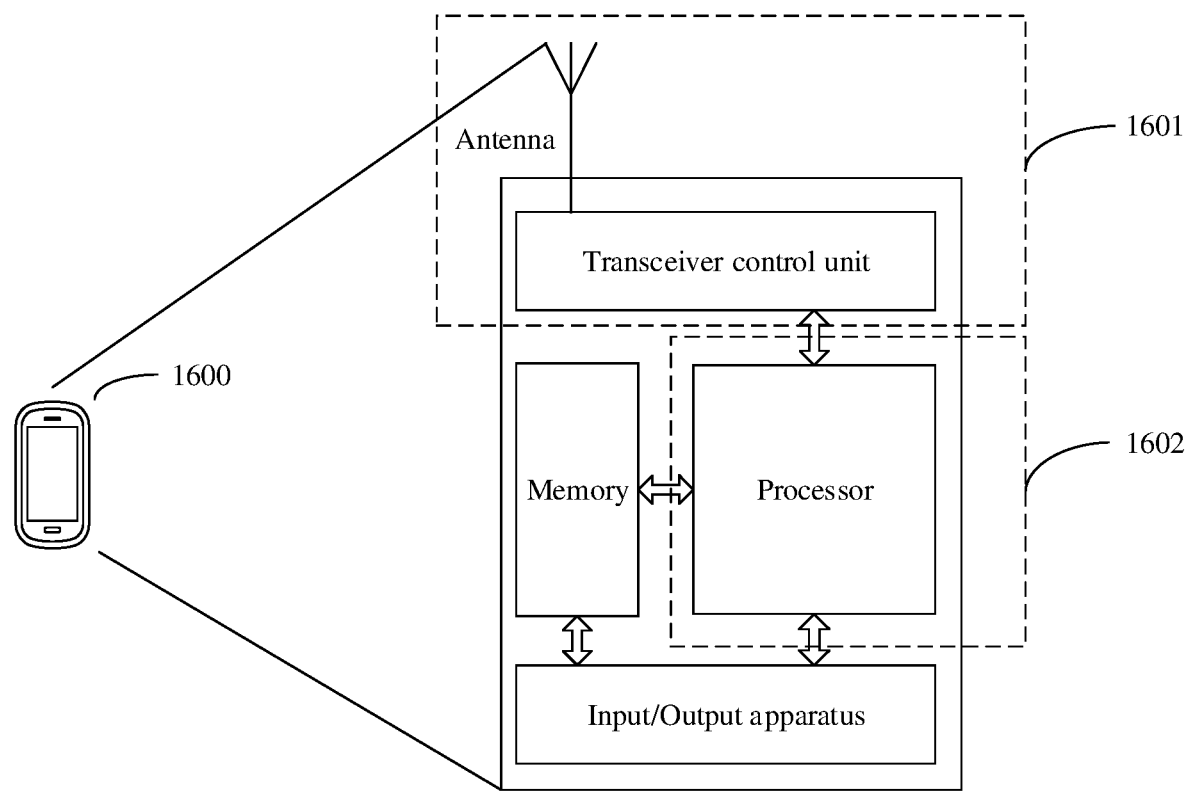
FIG. 16 is a schematic diagram of a structure of a terminal device according to an embodiment of this application.

As shown in FIG. 16, this application further provides a schematic diagram of a structure of a terminal device. The terminal device may be configured to implement functions of the terminal device in the foregoing method embodiments. For ease of description, FIG. 16 shows only main components of the terminal device. As shown in FIG. 16, the terminal device 1600 may include a processor 1602, a memory, and a transceiver control unit 1601, and optionally, may further include an antenna and/or an input/output apparatus. The processor may be configured to: process a communication protocol and communication data, control user equipment, and execute a software program. The memory may store a software program and/or data. The transceiver control unit may be configured to perform conversion between a baseband signal and a radio frequency signal and process the radio frequency signal. The transceiver control unit 1601 together with the antenna may also be referred to as a transceiver, and may be configured to receive and send the radio frequency signal. The input/output apparatus, for example, a touchscreen, a display, or a keyboard, may be configured to receive data entered by a user and output data to the user.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any conventional processor.

The method steps in embodiments of this application may be implemented by hardware, or may be implemented by a processor by executing software instructions. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (electrically EPROM, EEPROM), a register, a hard disk, a removable hard disk, a CD-ROM, or a storage medium of any other form well-known in the art. For example, a storage medium is coupled to the processor, so that the processor can read information from the storage medium and can write information to the storage medium. Certainly, the storage medium may also be a component of the processor. The processor and the storage medium may be located in the ASIC. In addition, the ASIC may be located in an access network device or a terminal device. Certainly, the processor and the storage medium may exist in the access network device or the terminal device as discrete components.

It should be understood that "an embodiment", "an implementation", or "an example" mentioned in the entire specification means that particular features, structures, or characteristics related to embodiments are included in at least one embodiment of this application. Therefore, "in an embodiment", "in an implementation", or "in an example" appearing throughout the specification does not necessarily refer to a same embodiment. In addition, these particular features, structures, or characteristics may be combined in one or more embodiments in any proper manner. It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

In addition, terms "system" and "network" may be used interchangeably in this specification. The term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between associated objects. The term "at least one" in this application means one or more, that is, includes one, two, three, or more; and the term "a plurality of" means two or more, that is, includes two, three, or more. "At least one of the following items (pieces)" or a similar expression thereof indicates any combination of these items, including any combination of a single item (piece) or a plurality of items (pieces). For example, at least one item (piece) of a, b, and c may indicate: a, b, c, a and b, a and c, b and c, or a, b, and c, where a, b, and c may be singular or plural. It should be understood that in embodiments of this application, "B corresponding to A" indicates that B is associated with A, and B may be determined based on A. However, it should be further understood that determining B based on A does not mean that B is determined based on only A, and B may be determined based on A and/or other information. In addition, unless otherwise stated, in embodiments of this application, ordinal numbers such as "first" and "second" are used to distinguish between a plurality of objects, and are not intended to limit an order, a time sequence, a priority, or importance of the plurality of objects. In addition, the terms "include" and "have" in embodiments, claims, and accompanying drawings of this application are not exclusive. For example, a process, a method, a system, a product, or a device that includes a series of steps or modules is not limited to the listed steps or modules, and may further include steps or modules that are not listed.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Various illustrative logic units and circuits described in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by the processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information to the storage medium. Optionally, the storage medium may be further integrated into the processor. The processor and the storage medium may be disposed in the ASIC.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

In one or more example designs, the functions described in embodiments of this application may be implemented by using hardware, software, firmware, or any combination thereof. If the functions are implemented by using software, the functions may be stored in a computer-readable medium, or are transmitted to the computer-readable medium in a form of one or more instructions or code. The computer-readable medium includes a computer storage medium and a communication medium that enables a computer program to transfer from one place to another place. The storage medium may be an available medium that can be accessed by any general-purpose or special computer. For example, such computer-readable medium may include but is not limited to a RAM, a ROM, an EEPROM, a CD-ROM, or another optical disc storage, disk storage, or another magnetic storage apparatus, or any other medium that may be used to carry or store program code in a form of an instruction or a data structure and in another form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, or a digital subscriber line (DSL), or in a wireless manner such as infrared, radio, or microwave, the software is also included in the defined computer-readable medium. The disk and the disc include a compact disc, a laser disc, an optical disc, a digital versatile disc (DVD), a floppy disk, and a Blu-ray disc. The disc usually copies data by a magnetic means, and the disk usually copies data optically by a laser means. The foregoing combination may also be included in the computer-readable medium.

A person skilled in the art should be aware that in one or more of the foregoing examples, the functions described in embodiments of this application may be implemented by using hardware, software, firmware, or any combination thereof. When the functions are implemented by software, the functions may be stored in a computer-readable medium or transmitted as one or more instructions or code in the computer-readable medium. The computer-readable medium includes a computer storage medium and a communication medium. The communication medium includes any medium that enables a computer program to be transmitted from one place to another. The storage medium may be any available medium accessible to a general-purpose or dedicated computer.

What is claimed is:

1. A method, comprising:
    sending, by a terminal device, a first request to a first core network element in response to the terminal device determining that a network does not meet a transmission requirement of service data, wherein the first request comprises one or more of an application identifier, service status information, or a service indicator, wherein the application identifier identifies an application to which the service data belongs, the service status information represents a transmission status of the service data, and the service indicator represents the transmission requirement of the service data;
    receiving, by the terminal device, a recovery policy from the first core network element, wherein the recovery policy enables the network to meet the transmission requirement of the service data; and
    executing, by the terminal device, the recovery policy.

2. The method according to claim 1, wherein executing, by the terminal device, the recovery policy comprises:
    when the recovery policy comprises performing protocol data unit (PDU) session re-establishment, triggering, by the terminal device, a PDU session re-establishment procedure;
    when the recovery policy comprises performing cell handover, selecting, by the terminal device, a first cell from neighboring cells of a serving cell of the terminal device, and triggering a procedure of handover from the serving cell to the first cell;
    when the recovery policy comprises performing access network device handover, selecting, by the terminal device, a first cell from neighboring cells of a serving cell of the terminal device, wherein the first cell and the serving cell belong to different access network devices, and triggering a procedure of handover from the serving cell to the first cell;
    when the recovery policy comprises performing communication network handover, triggering, by the terminal device, a procedure of handover from a currently accessed first communication network to a second communication network, wherein radio access technologies (RATs) used by the currently accessed first communication network and the second communication network are different; or
    when the recovery policy comprises performing application layer processing, performing, by the terminal device, the application layer processing based on a type of the service data.

3. The method according to claim 1, wherein the first core network element is a network data analytics function (NWDAF) network element, a policy control function (PCF) network element, or a session management network element.

4. The method according to claim 3, wherein the first core network element is the PCF network element, and sending, by the terminal device, the first request to the first core network element comprises:
    sending, by the terminal device, the first request to the PCF network element using the session management network element, wherein the first request is a protocol data unit (PDU) session modify request; or
    sending, by the terminal device, the first request to the PCF network element using a mobility management network element, wherein the first request is a registration request.

5. The method according to claim 3, wherein the first core network element is the NWDAF network element, and sending, by the terminal device, the first request to the first core network element comprises:
    sending, by the terminal device, the first request to the NWDAF network element by using the session management network element, wherein the first request is a protocol data unit (PDU) session modify request;
    sending, by the terminal device, the first request to the NWDAF network element by using a mobility management network element, wherein the first request is a registration request; or
    sending, by the terminal device, the first request to the NWDAF network element by using an application function (AF) network element, wherein the first request is a network status request.

6. A method, comprising:
    receiving, by a first core network element, a first request from a terminal device in response to the terminal device determining that a network does not meet a transmission requirement of service data, wherein the first request comprises one or more of an application identifier or service status information, the application identifier identifies an application to which the service data belongs, and the service status information represents a transmission status of the service data;
    sending, by the first core network element, a second request to a network data analytics function (NWDAF) network element, wherein the second request comprises one or more of the application identifier or the service status information;

receiving, by the first core network element, network transmission information from the NWDAF network element, wherein the network transmission information represents a transmission status of the network that provides a service for the terminal device;

generating, by the first core network element, a recovery policy based on the network transmission information, wherein the recovery policy enables the network that provides a service for the terminal device to meet the transmission requirement of the service data; and sending, by the first core network element, the recovery policy to a device to execute the recovery policy, wherein the device that executes the recovery policy is the terminal device or a first access network device accessed by the terminal device.

7. The method according to claim 6, wherein the first core network element is a policy control function (PCF) network element or a session management network element.

8. The method according to claim 6, wherein the network transmission information comprises network status information or network capability information; and wherein the network status information represents a transmission status of a network element in the network that provides a service for the terminal device, and the network capability information represents a service processing capability of the network element in the network that provides a service for the terminal device.

9. The method according to claim 8, wherein the network element in the network that provides the service for the terminal device comprises one or more of:

the first access network device that provides an access service for the terminal device, a first user plane network element that provides a user plane service for the terminal device, a cell accessed by the terminal device, or an application server that provides a service for the terminal device.

10. The method according to claim 9, wherein the first request and the second request further carry a service indicator, and the service indicator represents the transmission requirement of the service data.

11. A method, comprising:

receiving, by a network data analytics function (NWDAF) network element from a terminal device, a first request in response to the terminal device determining that a network does not meet a transmission requirement of service data, wherein the first request comprises one or more of an application identifier, service status information, or a service indicator, the application identifier identifies an application to which the service data belongs, the service status information represents a transmission status of the service data, and the service indicator represents the transmission requirement of the service data;

obtaining, by the NWDAF network element, network transmission information based on the first request, wherein the network transmission information represents a transmission status of the network that provides a service for the terminal device;

generating, by the NWDAF network element, a recovery policy based on the network transmission information, wherein the recovery policy enables the network that provides a service for the terminal device to meet the transmission requirement of the service data; and sending, by the NWDAF network element, the recovery policy to a device to execute the recovery policy, wherein the device that executes the recovery policy is the terminal device or an access network device accessed by the terminal device.

12. The method according to claim 11, wherein the network transmission information comprises network status information or network capability information; and wherein the network status information represents a transmission status of a network element in the network that provides a service for the terminal device, and the network capability information represents a service processing capability of the network element in the network that provides a service for the terminal device.

13. The method according to claim 12, wherein the network element in the network that provides a service for the terminal device comprises one or more of:

a first access network device that provides an access service for the terminal device, a first user plane network element that provides a user plane service for the terminal device, a cell accessed by the terminal device, or an application server that provides a service for the terminal device.

14. The method according to claim 13, wherein the generating, by the NWDAF network element, the recovery policy based on the network transmission information comprises:

determining, based on the network capability information, whether the service processing capability of the network element in the network that provides a service for the terminal device meets the service indicator, and generating the recovery policy.

15. The method according to claim 14, wherein the first request carries the service indicator, and the network capability information comprises one or more of:

first capability information, wherein the first capability information indicates a service processing capability of the first access network device accessed by the terminal device;

second capability information, wherein the second capability information represents a service processing capability of a first cell accessed by the terminal device;

third capability information, wherein the third capability information represents a service processing capability of the first user plane network element that provides the user plane service for the terminal device;

fourth capability information, wherein the fourth capability information represents a service processing capability of the application server that provides a service for the terminal device;

fifth capability information, wherein the fifth capability information indicates a service processing capability of a user plane network element comprised in a data network with which the terminal device registers; or sixth capability information, wherein the sixth capability information indicates a service processing capability of a cell comprised in a data network with which the terminal device registers.

16. The method according to claim 12, wherein the network status information comprises one or more of:

first load status information, wherein the first load status information represents a load status of a first access network device;

second load status information, wherein the second load status information represents a load status of a first cell;

third load status information, wherein the third load status information represents a load status of a first user plane network element;

fourth load status information, wherein the fourth load status information represents a load status of an application server;

fifth load status information, wherein the fifth load status information indicates whether a data network with which the terminal device registers comprises a user plane network element that is not congested; or sixth load status information, wherein the sixth load status information indicates whether a data network with which the terminal device registers comprises a cell that is not congested.

17. The method according to claim 16, wherein the device for executing the recovery policy is the terminal device, and the generating the recovery policy based on the network transmission information comprises:

when the first load status information indicates that the first access network device is congested and the third load status information indicates that the first user plane network element is not congested, generating a recovery policy comprising performing access network device handover;

when the second load status information indicates that the first cell is congested and the third load status information indicates that the first user plane network element is not congested, generating a recovery policy comprising performing cell handover;

when the third load status information indicates that the first user plane network element is congested and the fifth load status information indicates that the data network with which the terminal device registers does not comprise a second user plane network element, generating a recovery policy comprising protocol data unit (PDU) session re-establishment;

when the second load status information indicates that the first cell is congested and the sixth load status information indicates that the data network with which the terminal device registers does not comprise a second cell, generating a recovery policy comprising performing communication network handover, wherein a communication network before handover and a communication network after handover use different radio access technologies (RATs); or when the fourth load status information indicates that the application server that provides a service for the terminal device is congested, generating a recovery policy comprising performing application layer processing.

18. An apparatus, comprising:
a memory;
at least one processor; and
a transceiver;
wherein the memory is configured to store computer instructions;
wherein the transceiver is configured to receive and send information; and
wherein the at least one processor is coupled to the memory, and is configured to invoke the computer instructions in the memory, to enable the apparatus to perform operations including:

sending a first request to a first core network element in response to the apparatus determining that a network does not meet a transmission requirement of service data, wherein the first request comprises one or more of an application identifier, service status information, or a service indicator, wherein the application identifier identifies an application to which the service data belongs, the service status information represents a transmission status of the service data, and the service indicator represents the transmission requirement of the service data;

receiving a recovery policy from the first core network element, wherein the recovery policy enables the network to meet the transmission requirement of the service data; and executing the recovery policy.

19. A non-transitory computer-readable storage medium, wherein the non-transitory computer-readable storage medium stores computer-executable instructions, and when the computer-executable instructions are invoked by a terminal device, the terminal device is enabled to perform operations including:

sending a first request to a first core network element in response to the terminal device determining that a network does not meet a transmission requirement of service data, wherein the first request comprises one or more of an application identifier, service status information, or a service indicator, wherein the application identifier identifies an application to which the service data belongs, the service status information represents a transmission status of the service data, and the service indicator represents the transmission requirement of the service data;

receiving a recovery policy from the first core network element, wherein the recovery policy enables the network to meet the transmission requirement of the service data; and executing the recovery policy.

20. A chip, wherein the chip is coupled to a memory, and is configured to read and execute program instructions stored in the memory, to implement operations including:

sending a first request to a first core network element in response to the chip of a terminal device determining that a network does not meet a transmission requirement of service data, wherein the first request comprises one or more of an application identifier, service status information, or a service indicator, wherein the application identifier identifies an application to which the service data belongs, the service status information represents a transmission status of the service data, and the service indicator represents the transmission requirement of the service data;

receiving a recovery policy from the first core network element, wherein the recovery policy enables the network to meet the transmission requirement of the service data; and executing the recovery policy.

* * * * *